(12) United States Patent
Islam et al.

(10) Patent No.: US 12,256,434 B2
(45) Date of Patent: Mar. 18, 2025

(54) CONFIGURATIONS FOR TRANSMITTING RANDOM ACCESS PREAMBLE MESSAGES

(71) Applicant: Qualcomm Incorporated, San Diego, CA (US)

(72) Inventors: Muhammad Nazmul Islam, Littleton, MA (US); Tao Luo, San Diego, CA (US); Sumeeth Nagaraja, Los Altos, CA (US); Peng Cheng, Beijing (CN); Sundar Subramanian, San Diego, CA (US); Keiichi Kubota, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 16/634,563

(22) PCT Filed: Jul. 10, 2018

(86) PCT No.: PCT/CN2018/095138
§ 371 (c)(1),
(2) Date: Jan. 27, 2020

(87) PCT Pub. No.: WO2019/033876
PCT Pub. Date: Feb. 21, 2019

(65) Prior Publication Data
US 2020/0267770 A1 Aug. 20, 2020

(30) Foreign Application Priority Data
Aug. 14, 2017 (WO) ................ PCT/CN2017/097321

(51) Int. Cl.
*H04W 4/00* (2018.01)
*H04W 36/00* (2009.01)
(Continued)

(52) U.S. Cl.
CPC .... *H04W 74/0833* (2013.01); *H04W 36/0072* (2013.01); *H04W 72/046* (2013.01); *H04W 76/27* (2018.02); *H04W 36/08* (2013.01)

(58) Field of Classification Search
CPC .......... H04W 74/0833; H04W 72/046; H04W 76/27; H04W 36/08; H04W 76/40; H04W 36/0072; H04W 74/006; H04L 1/08
(Continued)

(56) References Cited

U.S. PATENT DOCUMENTS 9,730,249 B2 * 8/2017 Jha ..................... H04W 74/0833
9,788,322 B2 * 10/2017 Wong .................. H04W 72/121
(Continued)

FOREIGN PATENT DOCUMENTS

CN          101277517 A     10/2008
CN          102413548 A      4/2012
(Continued)

OTHER PUBLICATIONS

International Search Report and Written Opinion—PCT/CN2017/097321—ISA/EPO—Apr. 24, 2018.
(Continued)

*Primary Examiner* — Thai Dinh Hoang
(74) *Attorney, Agent, or Firm* — Holland & Hart LLP

(57) ABSTRACT

Methods, systems, and devices for wireless communication are described. In some wireless systems, a user equipment (UE) may access a network or cell using a random access (RACH) procedure. A base station may allocate dedicated RACH resources and common RACH resources for the UE to transmit a RACH preamble message on and may convey a configuration for the UE. In some cases, the UE may perform multiple transmissions of the RACH preamble message in the dedicated RACH resources, and based on the configuration may determine whether to perform a single or
(Continued)

multiple transmissions of the RACH preamble message in the common RACH resources. The UE may transmit the messages using the same or different uplink transmit beams, and the base station may receive the messages using the same or different uplink reception beams. These multiple transmissions may reduce latency and improve reliability of the RACH procedure.

26 Claims, 21 Drawing Sheets

(51) Int. Cl.
*H04W 72/044* (2023.01)
*H04W 74/0833* (2024.01)
*H04W 76/27* (2018.01)
*H04W 36/08* (2009.01)

(58) Field of Classification Search
USPC .................. 370/329–330, 335–345, 347–348
See application file for complete search history.

(56) References Cited

U.S. PATENT DOCUMENTS

| | | | |
|---|---|---|---|
| 2013/0250899 | A1 | 9/2013 | Jeong et al. |
| 2013/0336296 | A1 | 12/2013 | Dinan |
| 2014/0226575 | A1 | 8/2014 | Davydov et al. |
| 2015/0117374 | A1* | 4/2015 | Wu ................... H04W 74/0891 370/329 |
| 2015/0282010 | A1 | 10/2015 | Yang et al. |
| 2015/0359005 | A1 | 12/2015 | Wong et al. |
| 2016/0212737 | A1* | 7/2016 | Jang ................... H04W 72/0406 |
| 2016/0309506 | A1* | 10/2016 | Lim .................... H04W 74/006 |
| 2016/0309507 | A1* | 10/2016 | Park ....................... H04W 4/70 |
| 2017/0041960 | A1* | 2/2017 | Quan ................ H04W 74/0833 |
| 2017/0094688 | A1* | 3/2017 | Lee ........................ H04W 48/12 |
| 2017/0273056 | A1* | 9/2017 | Papasakellariou .. H04W 52/325 |
| 2017/0290064 | A1* | 10/2017 | Liu .................... H04W 74/0833 |
| 2018/0160448 | A1* | 6/2018 | Blankenship ..... H04W 74/0833 |
| 2018/0176957 | A1* | 6/2018 | Zhang .................. H04L 5/0053 |
| 2018/0242306 | A1* | 8/2018 | Wong .................. H04W 72/042 |
| 2018/0262975 | A1* | 9/2018 | Martinez Tarradell ...................... H04W 74/008 |
| 2018/0332625 | A1* | 11/2018 | Tsai ...................... H04B 7/0408 |
| 2019/0150218 | A1* | 5/2019 | Futaki ................... H04W 80/08 370/329 |
| 2019/0320430 | A1* | 10/2019 | Kim .................... H04L 27/2613 |
| 2020/0107275 | A1* | 4/2020 | Cho ................. H04W 74/0833 |
| 2020/0154326 | A1* | 5/2020 | Deenoo ................ H04W 36/08 |
| 2021/0105820 | A1* | 4/2021 | Kim ..................... H04B 7/0695 |
| 2021/0127425 | A1* | 4/2021 | Park .................. H04W 74/0833 |

FOREIGN PATENT DOCUMENTS

| | | |
|---|---|---|
| CN | 102668683 A | 9/2012 |
| CN | 105379336 A | 3/2016 |
| WO | WO-2019096679 A1 * | 5/2019 ........... H04B 7/0695 |

OTHER PUBLICATIONS

"3rd Generation Partnership Project; Technical Specification Group Radio Access Network; Study on New Radio (NR) Access Technology (Release 14)", 3GPP TR 38.912 V1.0.0 (Mar. 2017), 3GPP Draft, 38912-100_With_Rev_Marks, 3rd Generation Partnership Project (3GPP), Mobile Competence Centre, 650, Route Des Lucioles, F-06921 Sophia-Antipolis Cedex, France, vol. TSG RAN, Jul. 20, 2017 (Jul. 20, 2017), XP051628421, pp. 1-73, Retrieved from the Internet: URL:http://www.3gpp.org/ftp/tsg%5Fran/TSG%5FRAN/Early%5FTRs%5FTSs/TR38912%5FNR/v100/RP%2D170854%2Ezip [retrieved on Jul. 20, 2017] Sections 8.3.2.1.1-8.3.2.1.2, pp. 35-36.
CATT: "Further Details on NR 4-Step RA Procedure", 3GPP Draft, R1-1710035, 3GPP TSG RAN WG1 NR Ad-Hoc#2, Further Details on NR 4-Step RA Procedure, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051299260, 20 Pages, Retrieved from the Internet: URL:http://www.3gpp.org/ftp/Meetings_3GPP_SYNC/RAN1/Docs/ [retrieved on Jun. 26, 2017] Sections 1.-2.3, pp. 1-5.
Ericsson: "4-Step Random Access Procedure", 3GPP Draft, 3GPP TSG-RAN WG1 NR Ad- Hoc#2, R1-1711383_4-Step Random Access Procedure, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 17, 2017 (Jun. 17, 2017), XP051305543, pp. 1-18, Retrieved from the internet: URL: http://www.3gpp.org/ftp/tsg_ran/WG1_RL1/TSGR1_AH/NR_AH_1706/Docs/, http://www.3gpp.org/ftp/tsg_ran/WG1_RL1/TSGR1_AH/NR_AH_1706/Docs/, [retrieved on Jun. 17, 2017], figure 1, the Whole Document.
LG Electronics: "Discussion on RACH Procedure", 3GPP Draft, R1-1707594, 3GPP TSG RAN WG1 Meeting #89, RACH Procedure Final, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, May 14, 2017 (May 14, 2017), XP051272802, 12 Pages, Retrieved from the Internet: URL:http://www.3gpp.org/ftp/Meetings_3GPP_SYNC/RAN1/Docs/ [retrieved on May 14, 2017] Sections 1.-2.4, pp. 1-7, p. 10.
NTT Docomo Inc: "Discussion on 4-Step Random Access Procedure for NR", 3GPP Draft, 3GPP TSG RAN WG1 Meeting #88bis, R1-1705712_Discussion On 4-Step Random Access Procedure for NR Final, 3rd Generation Partnership Project (3GPP), Mobile Competence Centre, 650, Route Des Lucioles, F-06921 Sophia-Antipol, vol. RAN WG1, No. Spokane, USA, Apr. 3, 2017-Apr. 7, 2017, Apr. 2, 2017 (Apr. 2, 2017), XPO51243827, 8 Pages, Retrieved from the Internet: URL:http://www.3gpp.org/ftp/Meetings_3GPP_SYNC/RAN1/Docs/, [retrieved on Apr. 2, 2017] Sections 1.-2.4, pp. 1-6.
Supplementary European Search Report—EP18846010—Search Authority—Munich—Apr. 14, 2021.

* cited by examiner

CONFIGURATIONS FOR TRANSMITTING RANDOM ACCESS PREAMBLE MESSAGES

CROSS REFERENCES

The present application is a 371 national phase filing of International Application No. PCT/CN2018/095138 to Islam et al., entitled "CONFIGURATIONS FOR TRANSMITTING RANDOM ACCESS PREAMBLE MESSAGES," filed Jul. 10, 2018, which claims priority to International Application No. PCT/CN2017/097321 to Islam et al., entitled "CONFIGURATIONS FOR TRANSMITTING RANDOM ACCESS PREAMBLE MESSAGES," filed Aug. 14, 2017, each of which is assigned hereof.

BACKGROUND

The following relates generally to wireless communication and more specifically to configurations for transmitting random access preamble messages.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications between two wireless nodes, (e.g., between a base station and a UE), may use beams or beam-formed signals for transmission and/or reception. A base station may transmit beam-formed synchronization signals on downlink synchronization beams. A UE may receive a synchronization signal on one or more of the downlink synchronization beams, and thus be enabled to initiate a random access (RACH) procedure with the base station. In some instances, the UE may send a message to the base station as part of the RACH procedure. The UE may send the message using an uplink transmission beam, and the base station may receive the transmission using an uplink reception beam. However, in some cases, the base station may not receive the message (e.g., due to interference), or the UE or base station may not be able to determine the most reliable beams for transmission and reception.

SUMMARY

The described techniques relate to improved methods, systems, devices, or apparatuses that support configurations for transmitting random access preamble messages. Generally, the described techniques provide for a user equipment (UE) to initiate a random access (RACH) procedure in order to connect to a wireless network or target cell. A base station may allocate dedicated RACH resources and common RACH resources for the UE to transmit a RACH preamble message on and may convey a configuration for the UE. The UE may perform multiple transmissions of the RACH preamble message in the dedicated RACH resources. Additionally, based on the indicated configuration, the UE may determine whether to perform a single or multiple transmissions of the RACH preamble message in the common RACH resources. The UE may select resources for transmission of the RACH preamble message and may transmit the RACH preamble message to the base station. The UE may transmit the messages using the same or different uplink transmit beams, and the base station may receive the messages using the same or different uplink reception beams. The multiple transmissions of the RACH preamble message may reduce latency and improve reliability of the RACH procedure.

A method of wireless communication is described. The method may include identifying a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources, selecting a set of resources for transmitting the RACH preamble message based at least in part on the configuration, and transmitting the RACH preamble message on the selected set of resources.

An apparatus for wireless communication is described. The apparatus may include means for identifying a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources, means for selecting a set of resources for transmitting the RACH preamble message based at least in part on the configuration, and means for transmitting the RACH preamble message on the selected set of resources.

Another apparatus for wireless communication is described. The apparatus may include a processor, memory in electronic communication with the processor, and instructions stored in the memory. The instructions may be operable to cause the processor to identify a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources, select a set of resources for transmitting the RACH preamble message based at least in part on the configuration, and transmit the RACH preamble message on the selected set of resources.

A non-transitory computer readable medium for wireless communication is described. The non-transitory computer-readable medium may include instructions operable to cause a processor to identify a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources, select a set of resources for transmitting the RACH preamble message based at least in part on the configuration, and transmit the RACH preamble message on the selected set of resources.

Some examples of the method, apparatus, and non-transitory computer-readable medium described above may further include processes, features, means, or instructions for transmitting the RACH preamble message on the set of dedicated RACH resources a first time using a first uplink transmit beam. Some examples of the method, apparatus, and non-transitory computer-readable medium described above may further include processes, features, means, or instructions for transmitting the RACH preamble message on the set of dedicated RACH resources a second time using a second uplink transmit beam before the expiration of the RACH response window.

Some examples of the method, apparatus, and non-transitory computer-readable medium described above may further include processes, features, means, or instructions for transmitting the RACH preamble message in a first resource of the set of dedicated resources corresponding to a first uplink reception beam. Some examples of the method, apparatus, and non-transitory computer-readable medium described above may further include processes, features, means, or instructions for transmitting the RACH preamble message in a second resource of the set of dedicated resources corresponding to a second uplink reception beam.

In some examples of the method, apparatus, and non-transitory computer-readable medium described above, the first and second uplink transmit beams may be the same.

Some examples of the method, apparatus, and non-transitory computer-readable medium described above may further include processes, features, means, or instructions for transmitting the RACH preamble message on the set of common RACH resources once using a first uplink transmit beam before the expiration of the RACH response window.

Some examples of the method, apparatus, and non-transitory computer-readable medium described above may further include processes, features, means, or instructions for transmitting the RACH preamble message on the set of common RACH resources using a second uplink transmit beam after the expiration of the RACH response window.

Some examples of the method, apparatus, and non-transitory computer-readable medium described above may further include processes, features, means, or instructions for transmitting the RACH preamble message on the set of common RACH resources a first time using a first uplink transmit beam. Some examples of the method, apparatus, and non-transitory computer-readable medium described above may further include processes, features, means, or instructions for transmitting the RACH preamble message on the set of common RACH resources a second time using a second uplink transmit beam before the expiration of the RACH response window.

In some examples of the method, apparatus, and non-transitory computer-readable medium described above, the first and second transmission of the RACH preamble message on the set of common RACH resources correspond to different uplink reception beams.

Some examples of the method, apparatus, and non-transitory computer-readable medium described above may further include processes, features, means, or instructions for transmitting the RACH preamble message on the set of dedicated RACH resources a first time using a first uplink transmit beam. Some examples of the method, apparatus, and non-transitory computer-readable medium described above may further include processes, features, means, or instructions for transmitting the RACH preamble message on the set of dedicated RACH resources a second time using the first uplink transmit beam before the expiration of the RACH response window.

Some examples of the method, apparatus, and non-transitory computer-readable medium described above may further include processes, features, means, or instructions for receiving a downlink configuration message that indicates the configuration for transmitting the RACH preamble message.

In some examples of the method, apparatus, and non-transitory computer-readable medium described above, the downlink configuration message indicates whether to transmit single or multiple transmissions of the RACH preamble message on the set of common RACH resources before the expiration of the RACH response window.

In some examples of the method, apparatus, and non-transitory computer-readable medium described above, the downlink configuration message comprises a broadcast message or a radio resource control (RRC) message.

In some examples of the method, apparatus, and non-transitory computer-readable medium described above, the downlink configuration message comprises a handover command.

In some examples of the method, apparatus, and non-transitory computer-readable medium described above, the handover command may be generated by a serving cell and transmitted to a network entity via the serving cell.

Some examples of the method, apparatus, and non-transitory computer-readable medium described above may further include processes, features, means, or instructions for identifying a power ramping procedure based on the identified configuration.

Some examples of the method, apparatus, and non-transitory computer-readable medium described above may further include processes, features, means, or instructions for receiving information indicating the power ramping procedure, wherein the information is conveyed through a master information block (MIB), a system information block (SIB), a master system information block (MSIB), remaining minimum system information (RMSI), a handover message, or a combination thereof In some examples of the method, apparatus, and non-transitory computer-readable medium described above, the power ramping procedure may be further based at least in part on whether a correspondence exists between a transmit beam and a reception beam.

In some examples of the method, apparatus, and non-transitory computer-readable medium described above, the power ramping procedure may be further based at least in part on whether the RACH preamble message is transmitted on the set of dedicated RACH resources or on the set of common RACH resources.

Some examples of the method, apparatus, and non-transitory computer-readable medium described above may further include processes, features, means, or instructions for receiving a beam correspondence message that indicates a correspondence between an uplink reception beam and an uplink transmit beam.

In some examples of the method, apparatus, and non-transitory computer-readable medium described above, the set of dedicated RACH resources comprise time resources, frequency resources, preamble sequence resources, or a combination thereof. In some cases, the set of dedicated RACH resources are associated with a contention free random access procedure and not a contention based random access procedure.

In some examples of the method, apparatus, and non-transitory computer-readable medium described above, the set of common RACH resources comprise time resources, frequency resources, preamble sequence resources, or a combination thereof. In some cases, the set of common RACH resources are associated with a contention based random access procedure.

A method of wireless communication is described. The method may include identifying a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources, conveying the identified configuration, and receiving the RACH preamble message based at least in part on the configuration message.

An apparatus for wireless communication is described. The apparatus may include means for identifying a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources, means for conveying the identified configuration, and means for receiving the RACH preamble message based at least in part on the configuration message.

Another apparatus for wireless communication is described. The apparatus may include a processor, memory in electronic communication with the processor, and instructions stored in the memory. The instructions may be operable to cause the processor to identify a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources, convey the identified configuration, and receive the RACH preamble message based at least in part on the configuration message.

A non-transitory computer readable medium for wireless communication is described. The non-transitory computer-readable medium may include instructions operable to cause a processor to identify a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources, convey the identified configuration, and receive the RACH preamble message based at least in part on the configuration message.

Some examples of the method, apparatus, and non-transitory computer-readable medium described above may further include processes, features, means, or instructions for conveying a configuration message indicating whether to transmit single or multiple transmissions of the RACH preamble message on the set of common RACH resources before the expiration of the RACH response window.

Some examples of the method, apparatus, and non-transitory computer-readable medium described above may further include processes, features, means, or instructions for receiving the RACH preamble message on the set of dedicated RACH resources a first time on a first uplink transmit beam. Some examples of the method, apparatus, and non-transitory computer-readable medium described above may further include processes, features, means, or instructions for receiving the RACH preamble message on the set of dedicated RACH resources a second time on a second uplink transmit beam before the expiration of the RACH response window.

In some examples of the method, apparatus, and non-transitory computer-readable medium described above, the first and second uplink transmit beams may be the same.

Some examples of the method, apparatus, and non-transitory computer-readable medium described above may further include processes, features, means, or instructions for receiving the RACH preamble message on the set of common RACH resources once on a first uplink transmit beam before the expiration of the RACH response window.

Some examples of the method, apparatus, and non-transitory computer-readable medium described above may further include processes, features, means, or instructions for receiving the RACH preamble message on the set of common RACH resources on a second uplink transmit beam after the expiration of the RACH response window.

Some examples of the method, apparatus, and non-transitory computer-readable medium described above may further include processes, features, means, or instructions for receiving the RACH preamble message on the set of common RACH resources a first time on a first uplink transmit beam. Some examples of the method, apparatus, and non-transitory computer-readable medium described above may further include processes, features, means, or instructions for receiving the RACH preamble message on the set of common RACH resources a second time on a second uplink transmit beam before the expiration of the RACH response window.

In some examples of the method, apparatus, and non-transitory computer-readable medium described above, the first and second reception of the RACH preamble message on the set of common RACH resources correspond to different uplink reception beams.

Some examples of the method, apparatus, and non-transitory computer-readable medium described above may further include processes, features, means, or instructions for receiving the RACH preamble message on the set of dedicated RACH resources a first time on a first uplink transmit beam. Some examples of the method, apparatus, and non-transitory computer-readable medium described above may further include processes, features, means, or instructions for receiving the RACH preamble message on the set of dedicated RACH resources a second time on the first uplink transmit beam before the expiration of the RACH response window.

In some examples of the method, apparatus, and non-transitory computer-readable medium described above, the configuration message may be target-cell specific and may be conveyed via a serving cell.

In some examples of the method, apparatus, and non-transitory computer-readable medium described above, the configuration message may be the same for all target cells and may be conveyed via a serving cell.

In some examples of the method, apparatus, and non-transitory computer-readable medium described above, the configuration message comprises a broadcast message or an RRC message.

In some examples of the method, apparatus, and non-transitory computer-readable medium described above, the configuration message may be statically configured.

In some examples of the method, apparatus, and non-transitory computer-readable medium described above, the configuration message comprises a handover command.

In some examples of the method, apparatus, and non-transitory computer-readable medium described above, the handover command may be generated by a serving cell and transmitted to a network entity via the serving cell.

Some examples of the method, apparatus, and non-transitory computer-readable medium described above may further include processes, features, means, or instructions for identifying a power ramping procedure based on the identified configuration. Some examples of the method, apparatus, and non-transitory computer-readable medium described above may further include processes, features, means, or instructions for conveying information indicating the power ramping procedure.

In some examples of the method, apparatus, and non-transitory computer-readable medium described above, the information is conveyed through a MIB, a SIB, an MSIB, RMSI, a handover message, or a combination thereof.

In some examples of the method, apparatus, and non-transitory computer-readable medium described above, the power ramping procedure may correspond to the multiple transmissions of the RACH preamble message on the set of dedicated RACH resources. Some examples of the method, apparatus, and non-transitory computer-readable medium described above may further include processes, features, means, or instructions for identifying a second power ramping procedure corresponding to either the single or multiple transmissions of the RACH preamble message on the set of common RACH resources and based on the identified configuration. Some examples of the method, apparatus, and non-transitory computer-readable medium described above may further include processes, features, means, or instructions for conveying additional information indicating the second power ramping procedure.

In some examples of the method, apparatus, and non-transitory computer-readable medium described above, the power ramping procedure may correspond to either transmitting the RACH preamble message on the set of dedicated RACH resources or on the set of common RACH resources.

Some examples of the method, apparatus, and non-transitory computer-readable medium described above may further include processes, features, means, or instructions for transmitting a beam correspondence message that indicates a correspondence between an uplink reception beam and an uplink transmit beam.

In some examples of the method, apparatus, and non-transitory computer-readable medium described above, the set of dedicated RACH resources comprise time resources, frequency resources, preamble sequence resources, or a combination thereof. In some cases, the set of dedicated RACH resources are associated with a contention free random access procedure.

DETAILED DESCRIPTION

Figure 1:
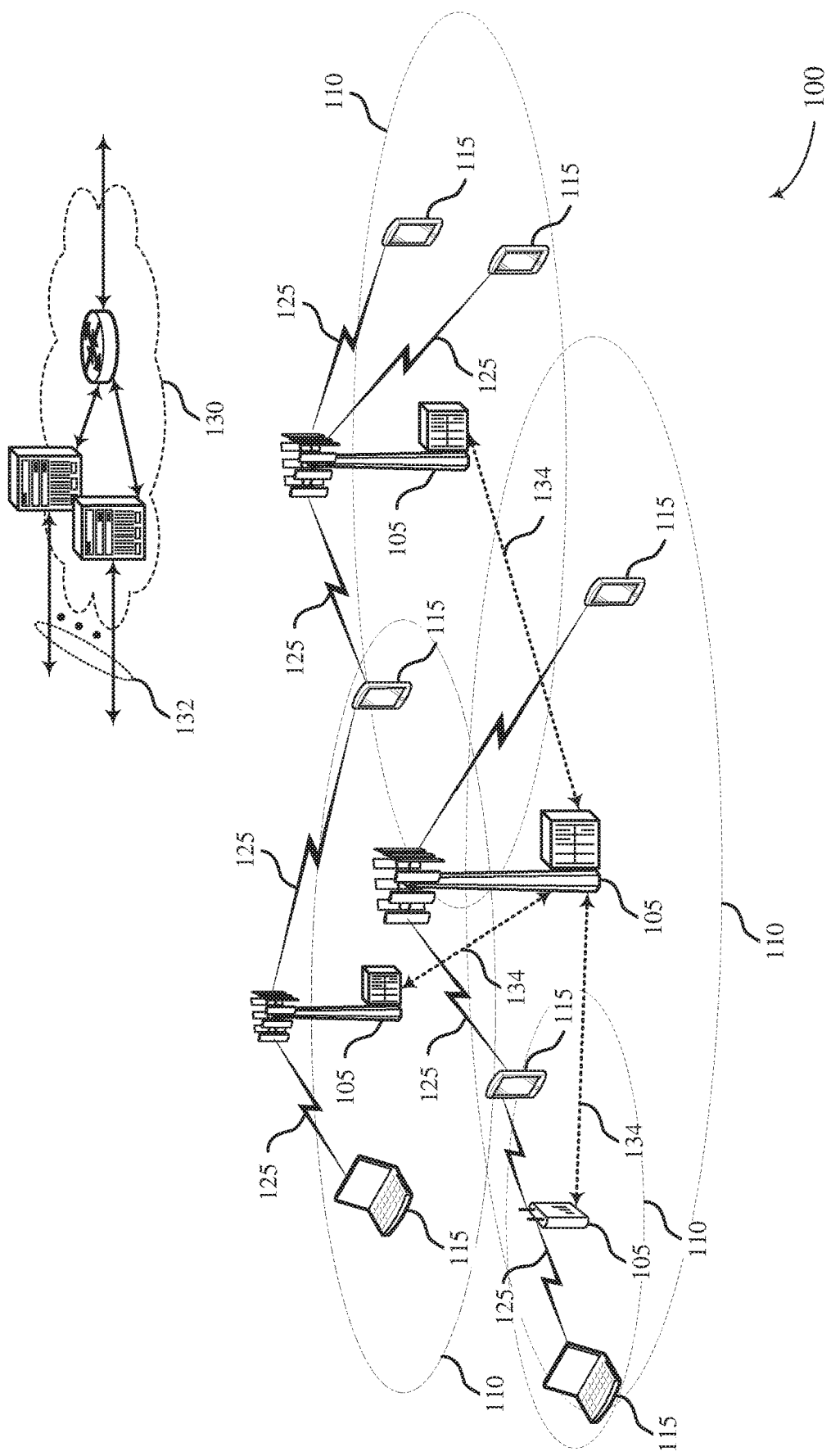
FIG. 1 illustrates an example of a system for wireless communication that supports configurations for transmitting random access preamble messages in accordance with aspects of the present disclosure.

In some wireless systems, user equipment (UEs) and base stations may use beams or beam-formed signals for transmission and/or reception. A UE may initiate an access procedure, such as a random access (RACH) procedure, by transmitting a message to a base station. This message may be an example of a RACH preamble message, which may also be referred to as a RACH message, a RACH request, or a RACH message 1 (Msg1). A base station may allocate resources for the UE to transmit the RACH preamble message. For example, the base station may allocate dedicated RACH resources and common RACH resources. In some cases, specific resources (e.g., in the time domain) in the allocated resources may correspond to specific receiving beams at the base station.

A UE may synchronize to a wireless network or a target cell using the RACH procedure. For example, the UE may transmit a RACH preamble message before or during a handover procedure from a serving cell to a target cell. In some cases, a base station may configure the UE to transmit multiple RACH preamble messages during or before the expiration of a random access response (RAR) window. The UE may transmit one or more instances of a RACH preamble message in the dedicated RACH resources. In some examples, the UE may use different uplink transmit beams—which may be referred to as uplink transmission beams—to transmit the RACH preamble messages. Similarly, the base station may receive the RACH preamble messages using different uplink reception beams, for example, based on the dedicated RACH resources selected for transmission.

Based on the indicated configuration of the UE, the UE either may transmit a RACH preamble message once in the common RACH resources or may transmit the RACH preamble message multiple times in the common RACH resources during a single RAR window. In the first case, the UE may use a single uplink transmission beam, and the base station may receive the RACH preamble message using a single uplink reception beam. In some cases, the UE or base station may utilize a different beam in a subsequent RAR window (e.g., if the UE does not receive a response from the base station during the RAR window). In the second case, the multiple RACH preamble transmissions may occur in different periodic sets of allocated resources in the RAR window. For each transmission of the RACH preamble message, the UE may either use the same or different uplink transmission beams, and the base station may use either the same or different uplink reception beams. Transmitting multiple RACH preamble messages in the dedicated RACH resources, the common RACH resources, or both may increase the reliability and reduce the latency of the RACH procedure. For example, if the base station fails to receive or decode a first RACH preamble message (e.g., due to interference), the base station may successfully receive and decode a second RACH preamble message during the same RAR window.

Aspects of the disclosure are initially described in the context of wireless communications systems. Additional aspects of the disclosure are described with respect to RACH messaging configurations and a process flow. Aspects of the disclosure are further illustrated by and described with reference to apparatus diagrams, system diagrams, and flowcharts that relate to configurations for transmitting random access preamble messages.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beam-forming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beam-forming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beam-forming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beam-forming weight set associated with a particular orientation (e.g., with respect to the antenna array of the transmitting device or receiving device, or with respect to some other orientation).

In one example, a base station 105 may use multiple antennas or antenna arrays to conduct beam-forming operations for directional communications with a UE 115. For instance, some signals (e.g. synchronization signals, reference signals, beam selection signals, or other control signals) may be transmitted by a base station 105 multiple times in different directions, which may include a signal being transmitted according to different beam-forming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beam-forming weight sets applied to signals received at a plurality of antenna elements of an antenna array, or by processing received signals according to different receive beam-forming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beam-forming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beam-forming of communications with a UE 115. Likewise, a UE 115 may have one or more antenna arrays that may support various MIMO or beam-forming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

During an initial access procedure, also referred to as a RACH procedure, a UE 115 may transmit a RACH preamble message to a base station 105. This may be known as RACH Msg1. For example, the RACH preamble may be randomly selected from a set of 64 predetermined sequences. This may enable the base station 105 to distinguish between multiple UEs 115 trying to access the system simultaneously. The base station 105 may respond with a random access response (RAR), or RACH message 2, that provides an uplink resource grant, a timing advance and a temporary cell radio network temporary identity (C-RNTI). In some cases, the base station 105 may have a specific length of time allotted to respond within, which may be referred to as a RAR window. If the UE 115 does not receive a RAR from the base station 105 during the RAR window, the UE 115 may repeat the access procedure during a subsequent RAR window. If the UE 115 does receive a RAR, the UE 115 may then transmit an RRC connection request, or RACH message 3, along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message, or RACH message 4, addressed to the UE 115, which may provide a new C-RNTI. If the UE 115 receives a contention resolution message with the correct identification, the UE 115 may proceed with RRC setup. If the UE 115 does not receive a contention resolution message (e.g., if there is a conflict with another UE 115) the UE 115 may repeat the RACH process by transmitting a new RACH preamble.

A UE 115 may synchronize to a wireless network or cell using the RACH procedure. For example, the UE 115 may perform the RACH procedure during a handover procedure from a serving cell to a target cell. In some cases, a base station 105 may configure the UE 115 to transmit multiple RACH preamble messages during a RAR window. The base station 105 may allocate designated RACH resources and common RACH resources for the UE 115. Common RACH resources may denote a set of time-frequency resources that may be used in a contention based random access procedure, and dedicated RACH resources may denote a set of time-frequency resources that may be used in a contention free random access procedure and may not be used in a contention bases random access procedure. The UE 115 may transmit one or more instances of a RACH preamble message in the dedicated RACH resources. In some examples, the UE 115 may use different uplink transmission beams—which may be referred to as uplink transmit beams—to transmit the RACH preamble messages. Additionally or alternatively, the base station 105 may receive the RACH preamble messages using different uplink reception beams, for example, based on the dedicated RACH resources selected for transmission.

Based on a configuration of the UE 115, the UE 115 either may transmit a RACH preamble message once in the common RACH resources or may transmit the RACH preamble message multiple times. In the first case, the UE 115 may use a single uplink transmission beam, and the base station 105 may receive the RACH preamble message using a single uplink reception beam. In some cases, the UE 115 or base station 105 may utilize a different beam in a subsequent RAR window if the RACH procedure is repeated. In the second case, the multiple RACH preamble transmissions may occur in different periodic sets of allocated resources in the RAR window. For each transmission of the RACH preamble message, the UE 115 may either use the same or different uplink transmission beams, and the base station 105 may use either the same or different uplink reception beams.

Figure 2:
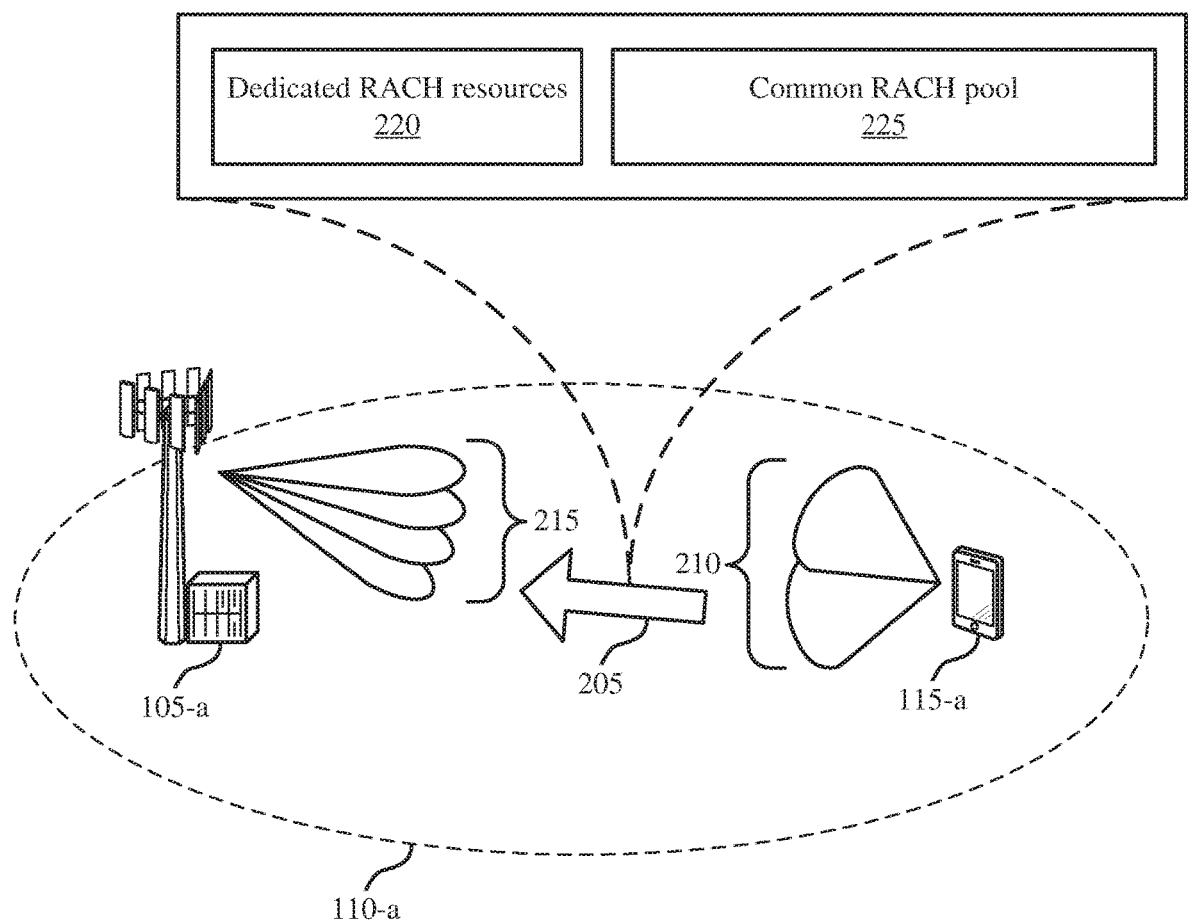
FIG. 2 illustrates an example of a wireless communication system that supports configurations for transmitting random access preamble messages in accordance with aspects of the present disclosure.

FIG. 2 illustrates an example of a wireless communication system 200 that supports configurations for transmitting random access preamble messages in accordance with various aspects of the present disclosure. The wireless communication system 200 may include base station 105-a and UE 115-a, which may be examples of a base station 105 and a UE 115, as described with reference to FIG. 1. Base station 105-a may provide network coverage for geographic area 110-a. Base station 105-a and UE 115-a may communicate using beam-formed or directional transmissions. For example, in the uplink case, UE 115-a may send an uplink transmission 205 to base station 105-a using uplink transmission beams 210, and base station 105-a may receive the uplink transmission 205 using uplink reception beams 215. The wireless communication system 200 may support multiple transmissions of messages over dedicated RACH resources 220, common RACH resources 225, or a combination of the two.

In some wireless systems (e.g., NR systems), a UE 115, such as UE 115-a, may transmit messages in order to synchronize with a network or a cell. For example, UE 115-a may transmit a RACH message, which may be referred to or an example of Msg1, a RACH preamble message, or a RACH request, to base station 105-a to connect to the network or target cell. This transmission of the RACH message may initialize a RACH procedure between UE 115-a and base station 105-a. In some cases, UE 115-a may transmit the RACH message to gain initial access to the wireless network (e.g., from an RRC idle state), to re-establish connection to the network, during a handover procedure, when uplink synchronization is lost, or in any other scenario where the UE 115 may synchronize with the base station 105. UE 115-a may transmit the RACH message based on one or more RACH parameters received from base station 105-a.

UE 115-a may transmit the RACH message with or without beam correspondence. A UE 115 with beam correspondence may map one or more uplink transmission beams 210 to one or more uplink reception beams 215 at a base station 105. Such a UE 115 may transmit the RACH message using a selected uplink transmission beam to the base station 105, and the base station 105 may receive the RACH message using a selected uplink reception beam. UE 115-a or base station 105-a may select these beams based on a signal strength, a channel quality, or some other transmission or reception parameter.

In some cases, UE 115-a may transmit multiple RACH messages within a RAR window, which may span a length of time based on a TTI of the UE 115 or base station 105 (e.g., 5 ms, 10 ms, etc.). If UE 115-a has no beam correspondence, the multiple RACH messages may support UE 115-a performing an uplink transmission beam sweep. Based on the uplink transmission beam sweep, UE 115-a may obtain beam correspondence by mapping one or more uplink transmission beams 210 to uplink reception beams 215 at base station 105-a. If UE 115-a already has beam correspondence, UE 115-a may obtain beam diversity based on transmitting the multiple RACH messages (e.g., if a beam corresponding to one of the multiple RACH messages experiences interference, base station 105-a may still receive the RACH message on another beam).

Base station 105-a may allocate resources for UEs 115 to transmit RACH messages. For example, base station 105-a may allocate a pool of common RACH resources 225 for any UEs 115. In some cases, a portion of resources in the pool of common RACH resources 225 may include dedicated preamble indices. Each dedicated preamble index may be associated with a UE 115, and that UE 115 may perform contention free random access using the common RACH resources 225 indicated by the dedicated preamble index. Additionally or alternatively, base station 105-*a* may allocate dedicated RACH resources 220 for a specific UE 115, such as UE 115-*a*. In some examples, the dedicated RACH resources 220 may reduce RACH transmission or reception latency. The allocated RACH resources may be examples of time domain RACH resources, frequency domain RACH resources, or preamble sequence domain RACH resources. Common RACH resources may denote a set of time-frequency resources that may be used in a contention based random access procedure, and dedicated RACH resources may denote a set of time-frequency resources that may be used in a contention free random access procedure and may not be used in a contention bases random access procedure.

The wireless communications system 200 may support a configuration for multiple dedicated RACH transmissions within a RAR window. In such a configuration, UE 115-*a* may perform multiple transmission of a RACH message at different times in dedicated RACH resources 220. The multiple RACH message transmissions may be sent using a same uplink transmission beam or using different uplink transmission beams 210. The UE 115 may send each transmission during a dedicated RACH transmission occasion in the time domain. In some cases, the time resources corresponding to the dedicated RACH transmission occasions in the time domain may be different than time resources for contention based random access.

In some cases (e.g., before or during a handover process), base station 105-*a* may transmit a handover command to UE 115-*a*. For example, base station 105-*a* may be an example of a serving cell and may transmit the handover command associated with a target cell to hand UE 115-*a* over to. In some examples, base station 105-*a* or another such serving cell may send the handover command to UE 115-*a* via a relay device. The handover command may indicate the dedicated RACH resources 220 for RACH message transmissions. The handover command may additionally include an indication of an association between RACH resources and channel state information reference signals (CSI-RS), which may be configured specifically for each UE 115. Additionally or alternatively, base station 105-*a* may transmit an indication of an association between RACH resources and synchronization signal (SS) blocks, a set of dedicated RACH resources 220 (e.g., time, frequency, or sequence), or other parameters for UE 115 synchronization.

In one aspect, UE 115-*a* may transmit multiple RACH messages (e.g., Msg1 transmissions) using different uplink transmission beams 210. Base station 105-*a* may receive one or more of the multiple RACH messages, and may transmit a response (e.g., a RACH response, Msg2, etc.) to UE 115-*a*. In some cases, base station 105-*a* may transmit responses on different downlink beams in response to received RACH messages over different uplink beams. For example, each beam of the uplink reception beams 215 may also be an example of a downlink transmission beam. Base station 105-*a* may receive a RACH message over a first uplink reception beam and may transmit a RACH response over a first downlink transmission beam, where the first uplink reception beam and first downlink transmission beam are the same beam. Transmitting the responses on different downlink beams may improve beam diversity and robustness, for example, during a handover process. UE 115-*a* and base station 105-*a* may operate in this way for RACH messages received using contention free resources in the pool of common RACH resources 225 and for RACH messages received using dedicated RACH resources 220 (e.g., signaled by a handover command).

In a second aspect, UE 115-*a* may transmit multiple RACH messages using a same uplink transmission beam. For example, UE 115-*a* may repeat a RACH message on a beam within a RAR window, or across multiple RAR windows. If UE 115-*a* has beam correspondence, UE 115-*a* may select an uplink transmission beam to use (e.g., based on a highest signal strength or channel quality) and may repeat transmissions using the same uplink transmission beam. For example, UE 115-*a* may transmit these repetitive transmissions in the dedicated RACH resources 220. Such repetitive transmissions may be similar or equivalent to implementing a long RACH format. However, a UE 115 without beam correspondence may in some cases transmit the repeated RACH messages using different uplink transmission beams.

In a third aspect, UE 115-*a* may operate using a combination of the first and second aspects. In some cases, a UE 115 may implement the third aspect for short-lived handover procedures. UE 115-*a* may transmit repeated RACH message transmissions for multiple beams in a RAR window. For example, UE 115-*a* may transmit a RACH message using a first uplink transmission beam and a second uplink transmission beam, and then may repeat both of these transmissions at a later time.

UE 115-*a* may transmit the RACH message using an identified configuration. In some cases, UE 115-*a* may receive an indication of the configuration in a downlink configuration transmission. In other cases, UE 115-*a* may be initially configured to operate using a certain configuration. In some cases (e.g., for a handover procedure), UE 115-*a* may receive a configuration for a specific target cell or may receive one or more configurations for a set of target cells. The configuration may indicate whether UE 115-*a* may transmit a single RACH message in the common RACH resources 225 for a RAR window or may transmit multiple instances of the RACH message in the common RACH resources 225 for the RAR window. These two possible configurations are described in detail below with reference to FIGS. 3 and 4. In some cases, a handover command may specify the configuration, and the configuration may indicate a broadcast or RRC configuration. In either configuration, UE 115-*a* may perform multiple transmissions of a RACH message in the dedicated RACH resources 220. Base station 105-*a* or UE 115-*a* may determine a configuration based on aspects of the wireless network, target cell, serving cell, base station 105-*a*, or UE 115-*a*. In other cases, base station 105-*a* or UE 115-*a* may determine the configuration based on available common RACH resources 225, latency requirements, an overhead threshold, or any other factor associated with a UE 115 using additional common RACH resources 225.

In some cases, UE 115-*a* may ramp up its power prior to transmission based on the identified configuration. In one example, base station 105-*a* may determine a power ramping procedure for UE 115-*a* to follow (e.g., based on the configuration or a beam correspondence), and may convey the power ramping procedure to UE 115-*a*. In some cases, base station 105-*a* may transmit the power ramping procedure to UE 115-*a* in the downlink configuration transmission, or in another transmission. For example, base station 105-*a* may transmit an indication of the power ramping procedure in a master information block (MIB), a system information block (SIB), a master system information block (MSIB), remaining minimum system information (RMSI), a handover message, or some combination of these messages. In some cases, base station 105-*a* may convey different power ramping procedures for RACH message transmissions in dedicated RACH resources 220 or common RACH resources 225. Additionally or alternatively, base station 105-*a* may convey different power ramping procedures based on a number of RACH messages previously sent.

UE 115-*a* may wake up or ramp up from a low power mode to a high power mode in order to transmit one or more RACH messages. The low power mode and high power mode may be defined with relation to one another (i.e., the low power mode may represent any power level so long as the high power mode represents a higher power level). UE 115-*a* may perform the power ramp based on identifying a power ramping procedure. For example, UE 115-*a* may identify the power ramping procedure in a transmission from base station 105-*a*. In other cases, UE 115-*a* may determine a power ramping procedure based on whether UE 115-*a* has beam correspondence with base station 105-*a* or based on a configuration of UE 115-*a*. In some cases, UE 115-*a* may identify different power ramping procedures for transmitting a RACH message in dedicated RACH resources 220 and for transmitting a RACH message in common RACH resources 225. UE 115-*a* may transition power modes before each RACH message transmission or before a first RACH message transmission, and in some cases may transition power modes (e.g., power down from a high power mode to a low power mode) following each RACH message transmission or following a last RACH message transmission (e.g., for a RAR window).

Figure 3:
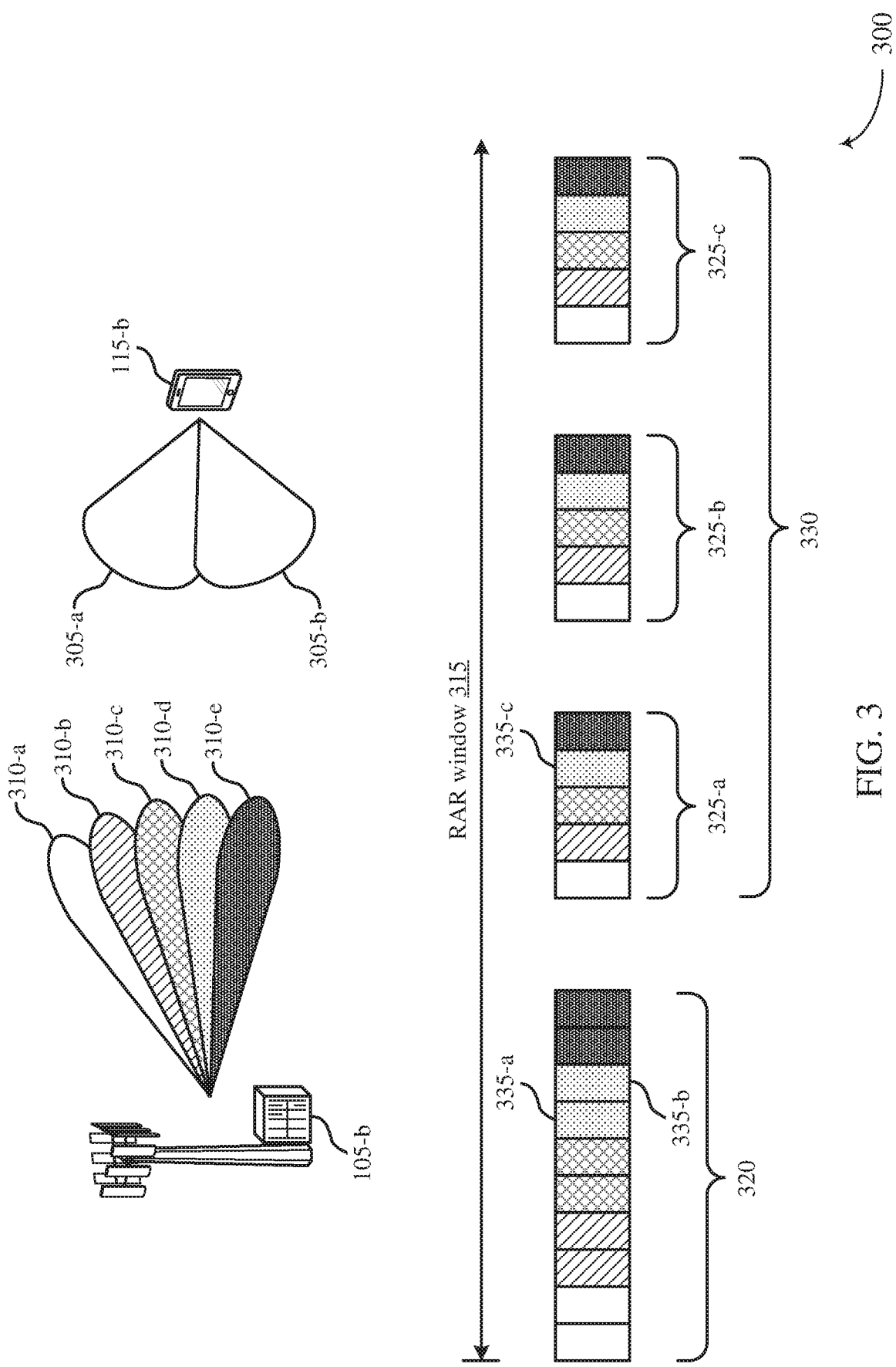
FIG. 3 illustrates an example of a random access (RACH) messaging configuration with a single RACH preamble transmission in common RACH resources that supports configurations for transmitting random access preamble messages in accordance with aspects of the present disclosure.

FIG. 3 illustrates an example of a RACH messaging configuration 300 with a single RACH preamble transmission in common RACH resources that supports configurations for transmitting random access preamble messages in accordance with various aspects of the present disclosure. The RACH messaging configuration 300 may include UE 115-*b* transmitting RACH messages on the uplink to base station 105-*b*. UE 115-*b* and base station 105-*b* may be examples of the corresponding devices as described with reference to FIGS. 1 and 2. As illustrated, UE 115-*b* may transmit the RACH messages using two uplink transmission beams 305 (e.g., uplink transmission beams 305-*a* and 305-*b*), and base station 105-*b* may receive the RACH messages using five uplink reception beams 310 (e.g., uplink reception beams 310-*a*, 310-*b*, 310-*c*, 310-*d*, and 310-*e*). However, UE 115-*b* and base station 105-*b* may operate using any number of transmission and reception beams. These uplink reception beams 310 may also support downlink transmissions from base station 105-*b*, such as synchronization signals. UE 115-*b* may transmit multiple RACH messages during a RAR window 315. For example, UE 115-*b* may transmit multiple RACH messages in dedicated RACH resources 320 and may transmit a single RACH message in common RACH resources 330 during the RAR window 315.

In the RACH messaging configuration 300, base station 105-*b* may allocate resources for UE 115-*b* to transmit RACH messages, such as RACH preamble messages, on. For example, base station 105-*b* may generate or allocate dedicated RACH resources 320, which may include one or more TTIs (e.g., symbols, slots, etc.) for each uplink reception beam 310. The dedicated RACH resources 320 may indicate RACH resources in the time domain, frequency domain, or preamble domain (e.g., a preamble sequence domain). In some cases, base station 105-*b* may configure UE 115-*b* to transmit a specific number of RACH messages in the dedicated RACH resources 320 and may include that specific number of TTIs for each uplink reception beam 310. Additionally or alternatively, base station 105-*b* may allocate periodic or aperiodic sets of common RACH resources 325 in a pool of common RACH resources 330. The dedicated RACH resources 320 and common RACH resources 330 may be distinct in the time domain. In some cases, each set of common RACH resources 325 may include one TTI per uplink reception beam 310. In contrast to including multiple TTIs per uplink reception beam 310, this may reduce overhead for the common RACH resources 330 during a RACH procedure.

Base station 105-*b* may configure UE 115-*b* to transmit multiple RACH messages (e.g., Msg1 transmissions) in the dedicated RACH resources 320, which may be examples of dedicated time domain RACH resources. In some cases, base station 105-*b* may specify a maximum number of RACH messages that UE 115-*b* may transmit in the dedicated RACH resources 320 (e.g., in one specific case, the same number as UE 115-*b* uplink transmission beams 305). UE 115-*b* may transmit a first RACH message using uplink transmission beam 305-*a* and a second RACH message using uplink transmission beam 305-*b* in the dedicated RACH resources 320. In some cases, the first and second RACH messages may contain similar or the same information. UE 115-*b* may select which uplink reception beam 310 to use for the RACH message transmission, for example, based on synchronization signals received from base station 105-*b* or based on a position of UE 115-*b* in relation to base station 105-*b*. In some examples, if UE 115-*b* transmits RACH messages for contention free random access in a mobility scenario (e.g., during a handover procedure), UE 115-*b* may already have detected uplink reception beams 310, and base station 105-*b* may previously have configured UE 115-*b* to transmit using a selected uplink reception beam 310.

As illustrated, base station 105-*b* may configure UE 115-*b* to transmit two RACH messages on the uplink. UE 115-*b* may select to transmit the RACH messages in resources 335-*a* and 335-*b* associated with uplink reception beam 310-*d* (e.g., based on a previous beam selection process or a beam correspondence). In some cases, UE 115-*b* may transmit the RACH message in resource 335-*a* using uplink transmission beam 305-*a* and may transmit the RACH message in resources 335-*b* using uplink transmission beam 305-*b* for beam diversity. In other cases, UE 115-*b* may transmit the RACH message in both resources 335-*a* and 335-*b* using either uplink transmission beam 305-*a* or 305-*b* to improve reliability in case of time dependent interference. In some examples, such as if UE 115-*b* and base station 105-*b* have not yet established beam correspondence, UE 115-*b* may transmit in resources 335 corresponding to different uplink reception beams 310. Depending on a maximum number of RACH messages UE 115-*b* may transmit in the dedicated RACH resources 320 in a RAR window 315, UE 115-*b* may transmit RACH messages in resources 335 corresponding to one or more uplink reception beams 310. UE 115-*b* may transmit these RACH messages in a same RAR window 315 or may transmit using resources 335 corresponding to different uplink reception beams 310 during different RAR windows 315.

For the RACH messaging configuration 300, UE 115-*b* may additionally or alternatively transmit a single RACH message to base station 105-*b* in the common RACH resources 330 (e.g., to reduce overhead). UE 115-*b* may transmit the RACH message in one set of common RACH resources 325 (e.g., set of common RACH resources 325-*a*, 325-*b*, or 325-*c*). As illustrated, UE 115-*b* may transmit the RACH message in resource 335-*c* corresponding to uplink reception beam 310-*d*. However, UE 115-*b* may instead transmit the RACH message in a different resource 335 corresponding to one of the other uplink reception beams 310, and UE 115-*b* may or may not transmit using resources 335 in the dedicated RACH resources 320 and the common RACH resources 330 corresponding to the same uplink reception beam 310. UE 115-*b* may transmit the RACH message using either uplink transmission beam 305-*a* or 305-*b*. In some cases, UE 115-*b* may repeat the transmission of the RACH message in a later RACH opportunity during a subsequent RAR window 315 using either the same or a different uplink transmission beam 305. For example, UE 115-*b* may not receive a response (e.g., a RACH response message, Msg2, etc.) from base station 105-*b* during RAR window 315 and may correspondingly determine to repeat one or more RACH message transmissions in a subsequent RAR window 315.

Figure 4:
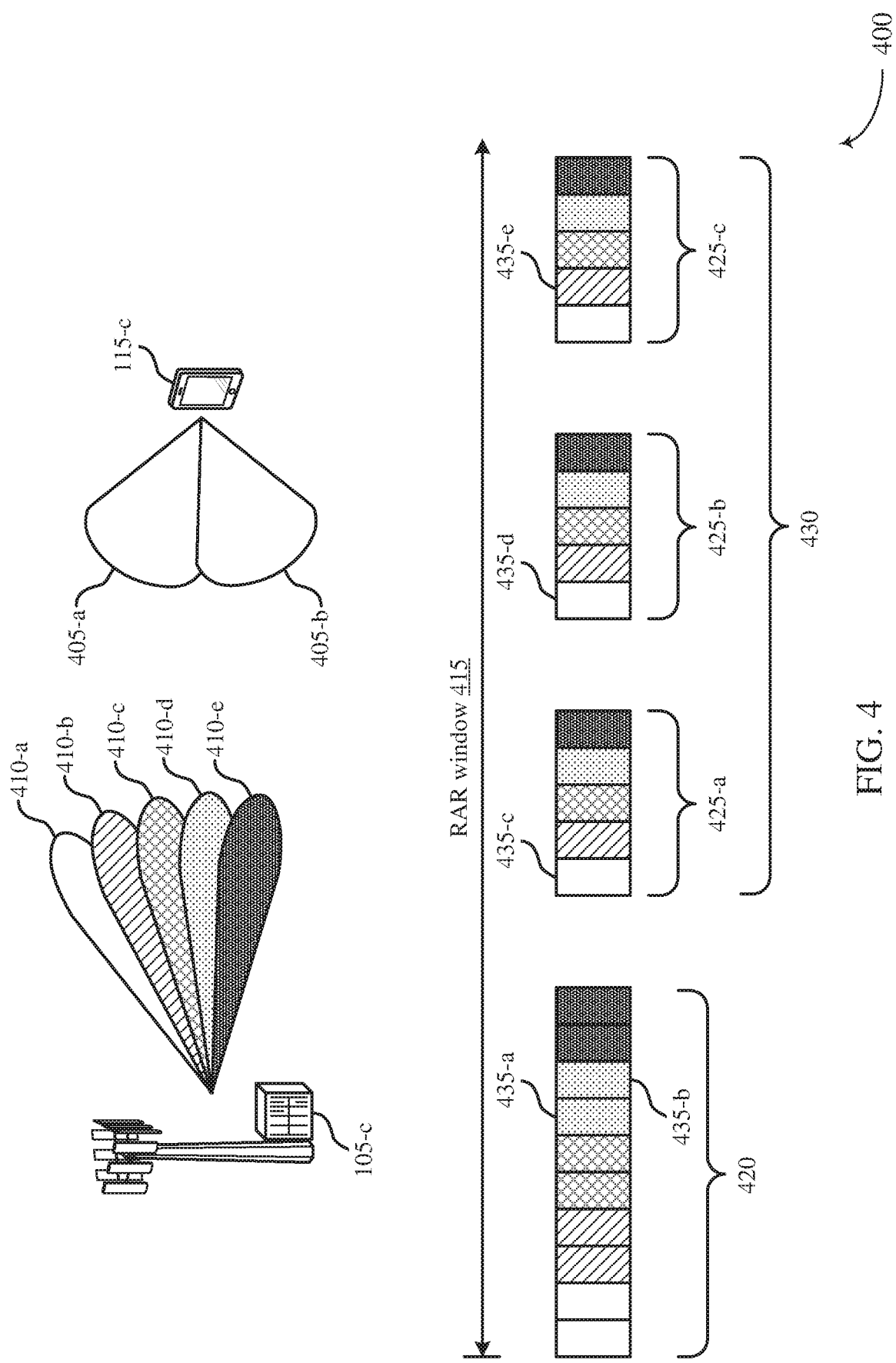
FIG. 4 illustrates an example of a RACH messaging configuration with multiple RACH preamble transmissions in common RACH resources that supports configurations for transmitting random access preamble messages in accordance with aspects of the present disclosure.

FIG. 4 illustrates an example of a RACH messaging configuration 400 with multiple RACH preamble transmissions in common RACH resources that supports configurations for transmitting random access preamble messages in accordance with various aspects of the present disclosure. The RACH messaging configuration 400 may include UE 115-*c* transmitting RACH messages on the uplink to base station 105-*c*. UE 115-*c* and base station 105-*c* may be examples of the corresponding devices as described with reference to FIGS. 1 and 2. As illustrated, UE 115-*c* may transmit the RACH messages using two uplink transmission beams 405 (e.g., uplink transmission bands 405-*a* and 405-*b*), and base station 105-*c* may receive the RACH messages using five uplink reception beams 410 (e.g., uplink reception beams 410-*a*, 410-*b*, 410-*c*, 410-*d*, and 410-*e*). However, UE 115-*c* and base station 105-*c* may operate using any number of transmission and reception beams. UE 115-*c* may transmit multiple RACH messages during a RAR window 415. For example, UE 115-*c* may transmit multiple RACH messages in dedicated RACH resources 420 and may transmit multiple RACH messages in common RACH resources 430 to base station 105-*c*.

As described above with reference to FIG. 3, base station 105-*c* may allocate dedicated RACH resources 420 and common RACH resources 430 for RACH message transmissions. UE 115-*c* may transmit multiple RACH messages in the dedicated RACH resources 420 as described above. For example, UE 115-*c* may transmit the RACH message in resources 435-*a* and 435-*b*, or in any other set of resources 435 in the dedicated RACH resources 420. However, in contrast to above, UE 115-*c* in the RACH messaging configuration 400 may repeatedly transmit a RACH message in the common RACH resources 430 within a RAR window 415. For example, UE 115-*c* may transmit the RACH message using different uplink transmission beams 405 or in resources 435 corresponding to different uplink reception beams 410 at base station 105-*c*.

As illustrated, UE 115-*c* may transmit a RACH message using a first uplink beam, such as uplink transmission beam 405-*a*, in resource 435-*c* corresponding to uplink reception beam 410-*a*. In a later set of common RACH resources 425-*b*, UE 115-*b* may repeat the transmission of the RACH message in another resource 435-*d* corresponding to the same uplink reception beam 410-*a*. UE 115-*b* may transmit this RACH message using either a different uplink beam, such as uplink transmission beam 405-*b*, or the same uplink beam. Additionally or alternatively, UE 115-*c* may repeat the transmission of the RACH message using a resource 435-*e* corresponding to a different uplink reception beam 410, such as uplink reception beam 410-*b*. UE 115-*c* may transmit this RACH message using either uplink transmission beam 405-*a* or 405-*b*. In this way, UE 115-*c* may sweep through a set of uplink transmission beam 405 and uplink reception beam 410 combinations to determine beam correspondence. Alternatively, UE 115-*c* may select certain uplink transmission beam 405 and uplink reception beam 410 combinations based on previously determined beam correspondence, signal strengths, or channel qualities, and may transmit the RACH message using the different beam combinations for signaling diversity. For example, UE 115-*c* may transmit the RACH message using uplink transmission beam 405-*a* on resource 435-*c* corresponding to uplink reception beam 410-*a* and may transmit the RACH message using uplink transmission beam 405-*b* on resource 435-*e* corresponding to uplink reception beam 410-*b*. UE 115-*c* may select these beam combinations based on signal strengths or channel qualities (e.g., compared to some signal strength or channel quality threshold).

In some cases, UE 115-*c* may transmit a RACH message in each set of common RACH resources 425 (e.g., sets of common RACH resources 425-*a*, 425-*b*, and 425-*c*) using the same or different uplink transmission beams 405 or uplink reception beams 410. In other cases, UE 115-*c* may transmit a RACH message in a subset of the set of common RACH resources 425, for example, based on a configured maximum number of RACH messages to transmit in the common RACH resources 430 within a RAR window 415, signal strengths or channel qualities associated with specific beams, or some other RACH messaging parameter.

Figure 5:
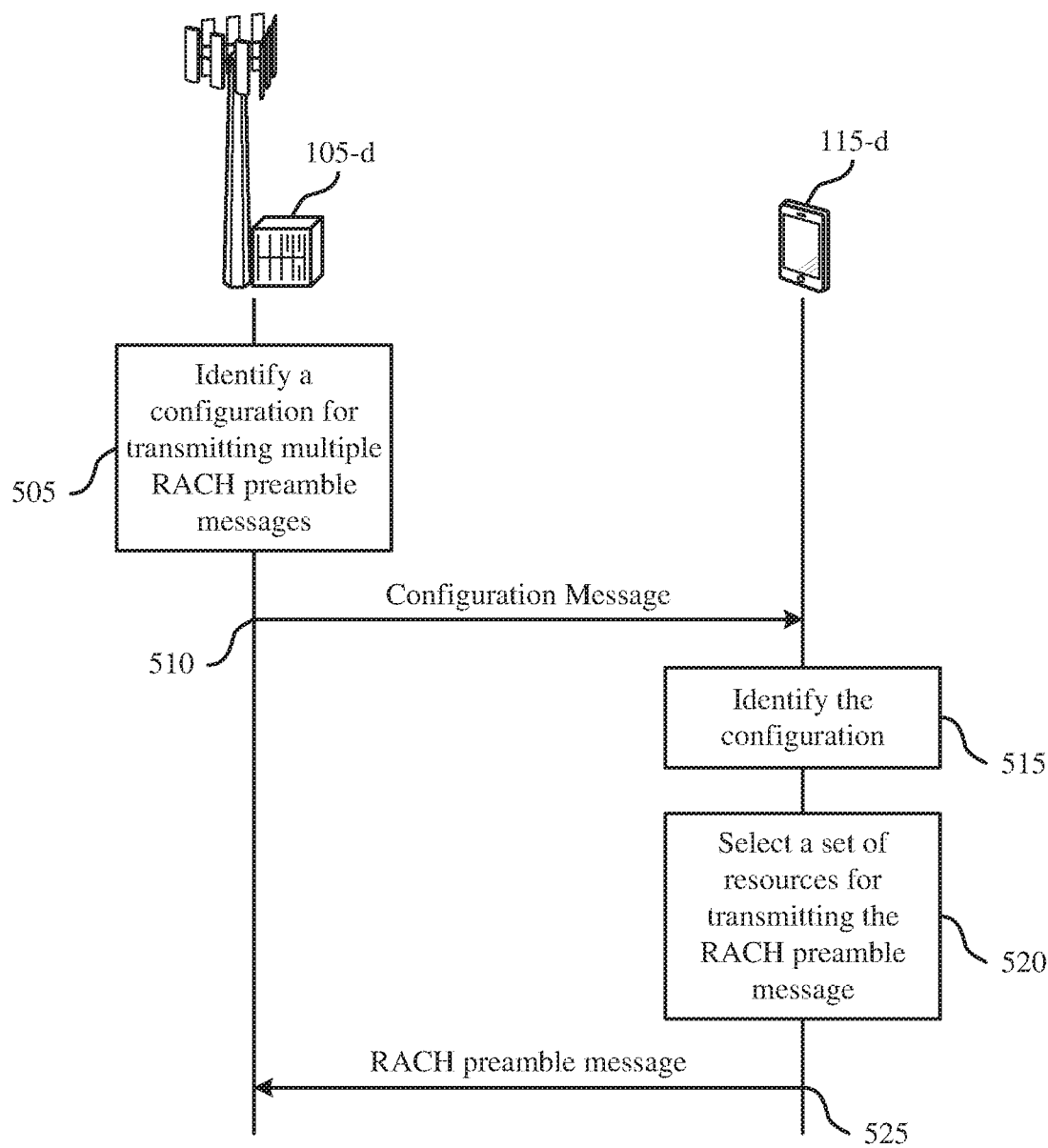
FIG. 5 illustrates an example of a process flow that supports configurations for transmitting random access preamble messages in accordance with aspects of the present disclosure.

FIG. 5 illustrates a process flow 500 that supports configurations for transmitting random access preamble messages in accordance with various aspects of the present disclosure. The process flow 500 may include base station 105-*d* and UE 115-*d*, which may be examples of the corresponding devices as described with reference to FIGS. 1, 2, 3, and 4. Base station 105-*d* may configure UE 115-*d* for transmission of multiple RACH messages in a RAR window.

At 505, base station 105-*d* may identify a configuration for UE 115-*d* to repeatedly transmit RACH preamble messages before an expiration of a RAR window. The configuration may support multiple transmissions of the RACH preamble message on a set of dedicated RACH resources. In some cases, the configuration may support single transmission of the RACH preamble message on a set of common RACH resources. In other cases, the configuration may support multiple transmissions of the RACH preamble message on a set of common RACH resources. Additionally, in some cases, base station 105-*d* may identify one or more power ramping procedures for UE 115-*d* based on the identified configuration or a beam correspondence. For example, base station 105-*d* may identify different power ramping procedures for RACH preamble message transmissions on dedicated RACH resources and on common RACH resources.

At 510, base station 105-*d* may transmit a downlink configuration message to UE 115-*d*. Alternatively, base station 105-*d* may convey the downlink configuration message to UE 115-*d* at some other time. The downlink configuration message may indicate whether to transmit single or multiple RACH preamble message transmissions on the set of common RACH resources before the expiration of the RAR window. The downlink configuration message may be an example of a broadcast message, an RRC message, or a handover command. In some cases, base station 105-*d* may additionally transmit a beam correspondence message to UE 115-*d* indicating a correspondence between a downlink beam—which may be referred to as an uplink reception beam—and an uplink beam. Further, base station 105-*d* may convey the one or more power ramping procedures to UE 115-*d*. For example, base station 105-*d* may convey the one or more power ramping procedures through a MIB, a SIB, an MSIB, RMSI, a handover message, or some combination of these messages.

At 515, UE 115-*d* may identify the configuration for repeatedly transmitting the RACH preamble message. For example, UE 115-*d* may identify the configuration based on the received downlink configuration message. At 520, UE 115-*d* may select a set of resources for transmitting the RACH preamble message based on the identified configuration. In some cases, UE 115-*d* may additionally ramp up power for transmission based on identifying power ramping procedures (e.g., based on the information received from base station 105-*d*, whether UE 115-*d* has beam correspondence, etc.). In certain examples, UE 115-*d* may ramp up power differently for transmissions on dedicated RACH resources and for transmissions on common RACH resources.

At 525, UE 115-*d* may transmit the RACH preamble message on the selected set of resources to base station 105-*d*. For example, UE 115-*d* may transmit the RACH preamble message multiple times during a RAR window, either on a same uplink beam or on different uplink beams. For example, UE 115-*d* may transmit the RACH preamble message multiple times on a set of dedicated RACH resources, on a set of common RACH resources, or both before the expiration of the RAR window. In some cases, UE 115-*d* may transmit the RACH preamble message on a set of common RACH resources once using a first beam during a RAR window and may transmit the RACH preamble message on the set of common RACH resources a second time using the same or a different beam in a subsequent RAR window.

Figure 6:
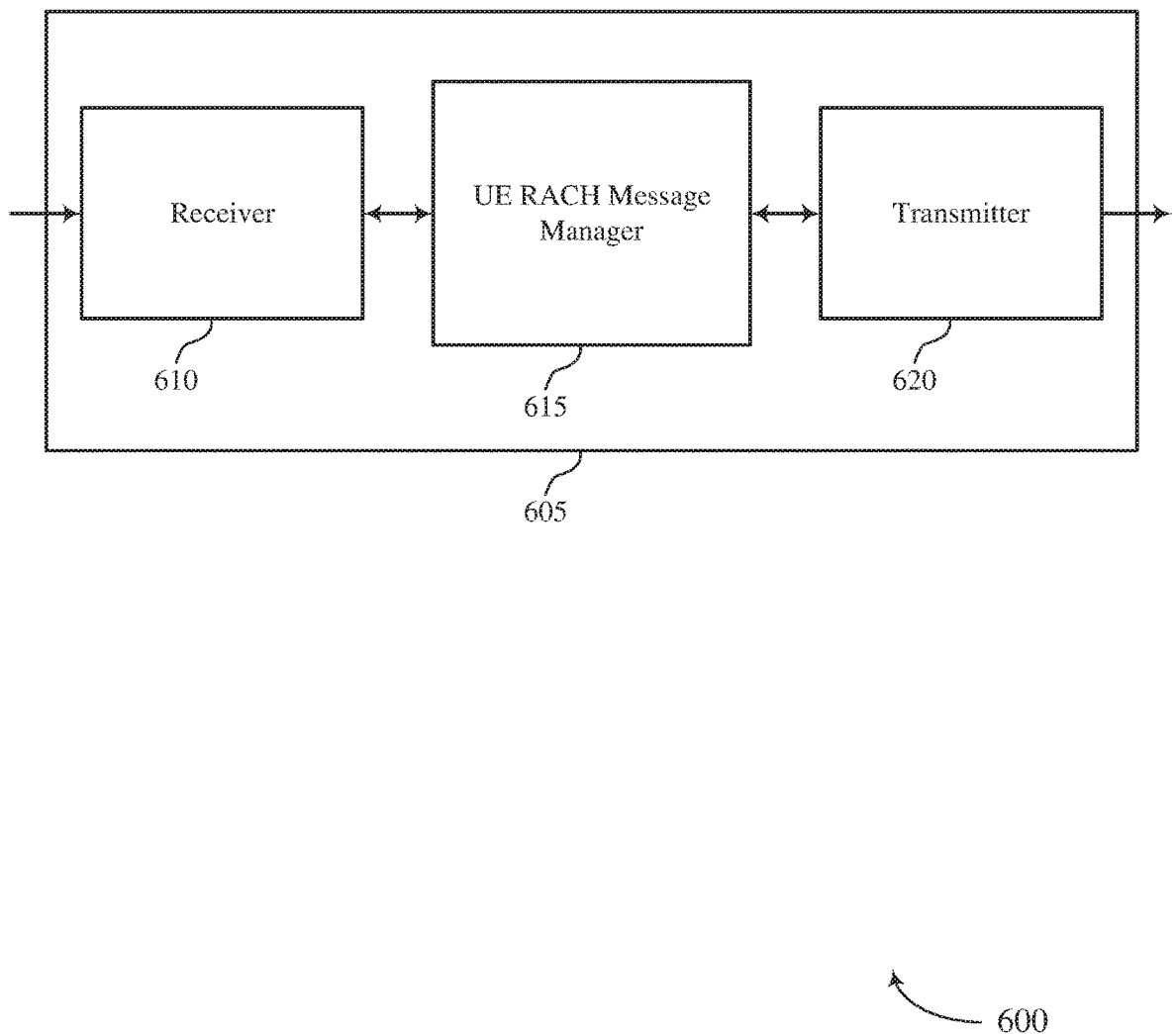
FIGS. 6 through 8 show block diagrams of a device that supports configurations for transmitting random access preamble messages in accordance with aspects of the present disclosure.

FIG. 6 shows a block diagram 600 of a wireless device 605 that supports configurations for transmitting random access preamble messages in accordance with aspects of the present disclosure. Wireless device 605 may be an example of aspects of a UE 115 as described herein. Wireless device 605 may include receiver 610, UE RACH message manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to configurations for transmitting random access preamble messages, etc.). Information may be passed on to other components of the device. The receiver 610 may be an example of aspects of the transceiver 935 described with reference to FIG. 9. The receiver 610 may utilize a single antenna or a set of antennas.

UE RACH message manager 615 may be an example of aspects of the UE RACH message manager 915 described with reference to FIG. 9. UE RACH message manager 615 and/or at least some of its various sub-components may be implemented in hardware, software executed by a processor, firmware, or any combination thereof. If implemented in software executed by a processor, the functions of the UE RACH message manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE RACH message manager 615 and/or at least some of its various sub-components may be physically located at various positions, including being distributed such that portions of functions are implemented at different physical locations by one or more physical devices. In some examples, UE RACH message manager 615 and/or at least some of its various sub-components may be a separate and distinct component in accordance with various aspects of the present disclosure. In other examples, UE RACH message manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE RACH message manager 615 may identify a configuration for transmitting a RACH preamble message repeatedly before an expiration of a RACH response window, where the configuration supports multiple transmissions of the RACH preamble message on a set of dedicated RACH resources and either single or multiple transmissions of the RACH preamble message on a set of common RACH resources. UE RACH message manager 615 may select a set of resources for transmitting the RACH preamble message based on the configuration and may transmit the RACH preamble message on the selected set of resources.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
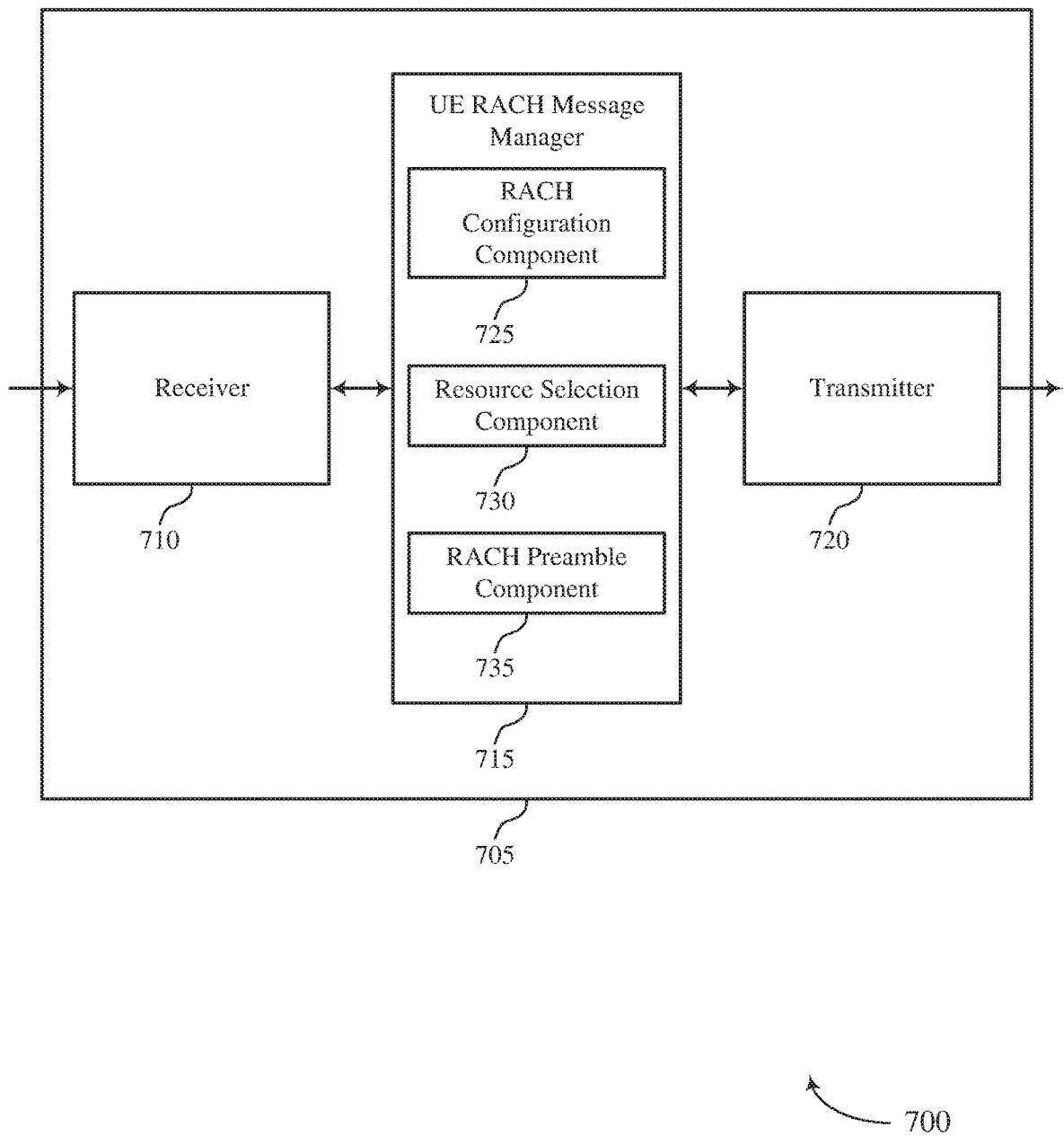

FIG. 7 shows a block diagram 700 of a wireless device 705 that supports configurations for transmitting random access preamble messages in accordance with aspects of the present disclosure. Wireless device 705 may be an example of aspects of a wireless device 605 or a UE 115 as described with reference to FIG. 6. Wireless device 705 may include receiver 710, UE RACH message manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to configurations for transmitting random access preamble messages, etc.). Information may be passed on to other components of the device. The receiver 710 may be an example of aspects of the transceiver 935 described with reference to FIG. 9. The receiver 710 may utilize a single antenna or a set of antennas.

UE RACH message manager 715 may be an example of aspects of the UE RACH message manager 915 described with reference to FIG. 9. UE RACH message manager 715 may also include RACH configuration component 725, resource selection component 730, and RACH preamble component 735.

RACH configuration component 725 may identify a configuration for transmitting a RACH preamble message repeatedly before an expiration of a RACH response window, where the configuration supports multiple transmissions of the RACH preamble message on a set of dedicated RACH resources and either single or multiple transmissions of the RACH preamble message on a set of common RACH resources.

Resource selection component 730 may select a set of resources for transmitting the RACH preamble message based on the configuration. RACH preamble component 735 may transmit the RACH preamble message on the selected set of resources.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
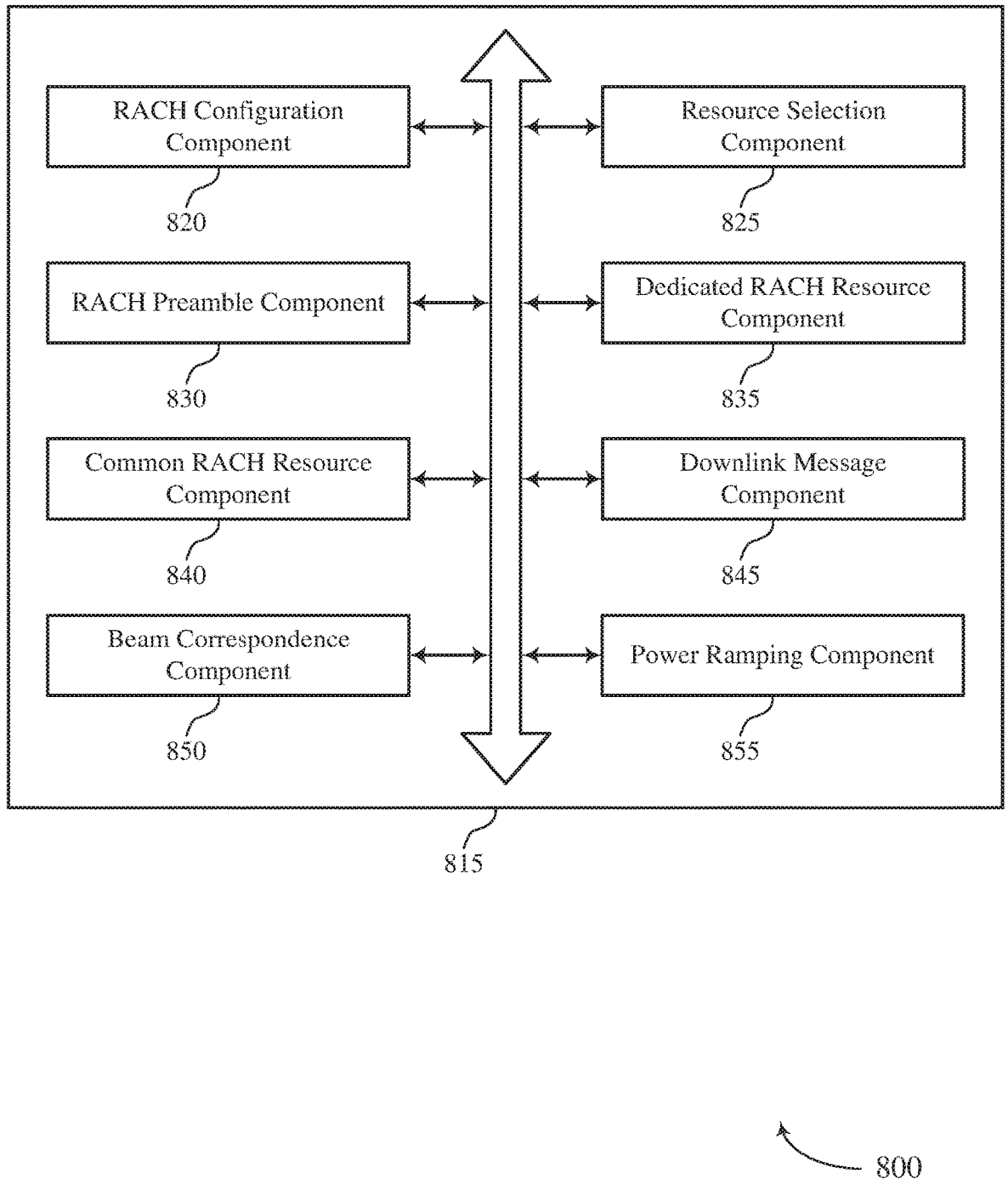

FIG. 8 shows a block diagram 800 of a UE RACH message manager 815 that supports configurations for transmitting random access preamble messages in accordance with aspects of the present disclosure. The UE RACH message manager 815 may be an example of aspects of a UE RACH message manager 615, a UE RACH message manager 715, or a UE RACH message manager 915 described with reference to FIGS. 6, 7, and 9. The UE RACH message manager 815 may include RACH configuration component 820, resource selection component 825, RACH preamble component 830, dedicated RACH resource component 835, common RACH resource component 840, downlink message component 845, and beam correspondence component 850. Each of these modules may communicate, directly or indirectly, with one another (e.g., via one or more buses).

RACH configuration component 820 may identify a configuration for transmitting a RACH preamble message repeatedly before an expiration of a RACH response window, where the configuration supports multiple transmissions of the RACH preamble message on a set of dedicated RACH resources and either single or multiple transmissions of the RACH preamble message on a set of common RACH resources.

Resource selection component 825 may select a set of resources for transmitting the RACH preamble message based on the configuration. RACH preamble component 830 may transmit the RACH preamble message on the selected set of resources.

Dedicated RACH resource component 835 may transmit the RACH preamble message on the set of dedicated RACH resources a first time using a first uplink transmit beam, transmit the RACH preamble message on the set of dedicated RACH resources a second time using the first or a second uplink transmit beam before the expiration of the RACH response window, transmit the RACH preamble message in a first resource of the set of dedicated resources corresponding to a first uplink reception beam, and transmit the RACH preamble message in a second resource of the set of dedicated resources corresponding to a second uplink reception beam. In some cases, the first and second uplink transmit beams are the same. In some cases, the set of dedicated RACH resources include time resources, frequency resources, preamble sequence resources, or a combination thereof. In some cases, the set of dedicated RACH resources are associated with a contention free random access procedure.

In some cases, common RACH resource component 840 may transmit the RACH preamble message on the set of common RACH resources once using a first uplink transmit beam before the expiration of the RACH response window and may transmit the RACH preamble message on the set of common RACH resources using a second uplink transmit beam after the expiration of the RACH response window. In other cases, common RACH resource component 840 may transmit the RACH preamble message on the set of common RACH resources a first time using a first uplink transmit beam and transmit the RACH preamble message on the set of common RACH resources a second time using a second uplink transmit beam before the expiration of the RACH response window. In some cases, the first and second transmission of the RACH preamble message on the set of common RACH resources correspond to different uplink reception beams.

Downlink message component 845 may receive a downlink configuration message that indicates the configuration for transmitting the RACH preamble message. In some cases, the downlink configuration message indicates whether to transmit single or multiple transmissions of the RACH preamble message on the set of common RACH resources before the expiration of the RACH response window. In some cases, the downlink configuration message includes a broadcast message or an RRC message. In some cases, the downlink configuration message includes a handover command. In some cases, the handover command is generated by a serving cell and transmitted to a network entity via the serving cell.

Beam correspondence component 850 may receive a beam correspondence message that indicates a correspondence between an uplink reception beam and an uplink transmit beam.

Power ramping component 855 may identify a power ramping procedure based on the identified configuration. Power ramping component 855 may receive information indicating the power ramping procedure, where the information may include or be an example of a MIB, a SIB, an MSIB, RMSI, a handover message, or some combination of these. In some cases, the power ramping procedure may be further based on whether a correspondence exists between an uplink transmit beam and an uplink reception beam. Additionally or alternatively, the power ramping procedure may be further based on whether the RACH preamble message is transmitted on the set of dedicated RACH resources or on the set of common RACH resources.

Figure 9:
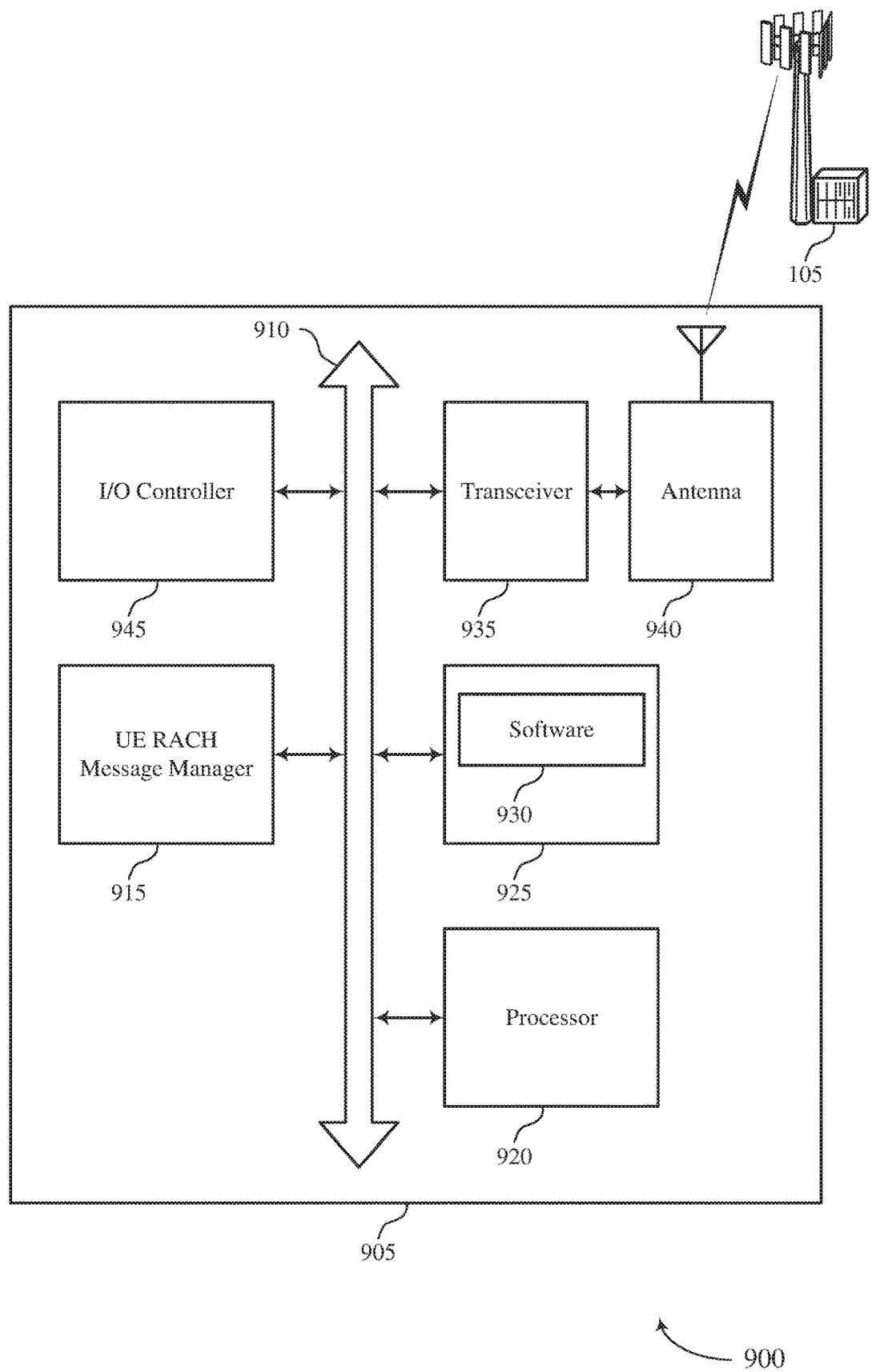
FIG. 9 illustrates a block diagram of a system including a UE that supports configurations for transmitting random access preamble messages in accordance with aspects of the present disclosure.

FIG. 9 shows a diagram of a system 900 including a device 905 that supports configurations for transmitting random access preamble messages in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE RACH message manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting configurations for transmitting random access preamble messages).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support configurations for transmitting random access preamble messages. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
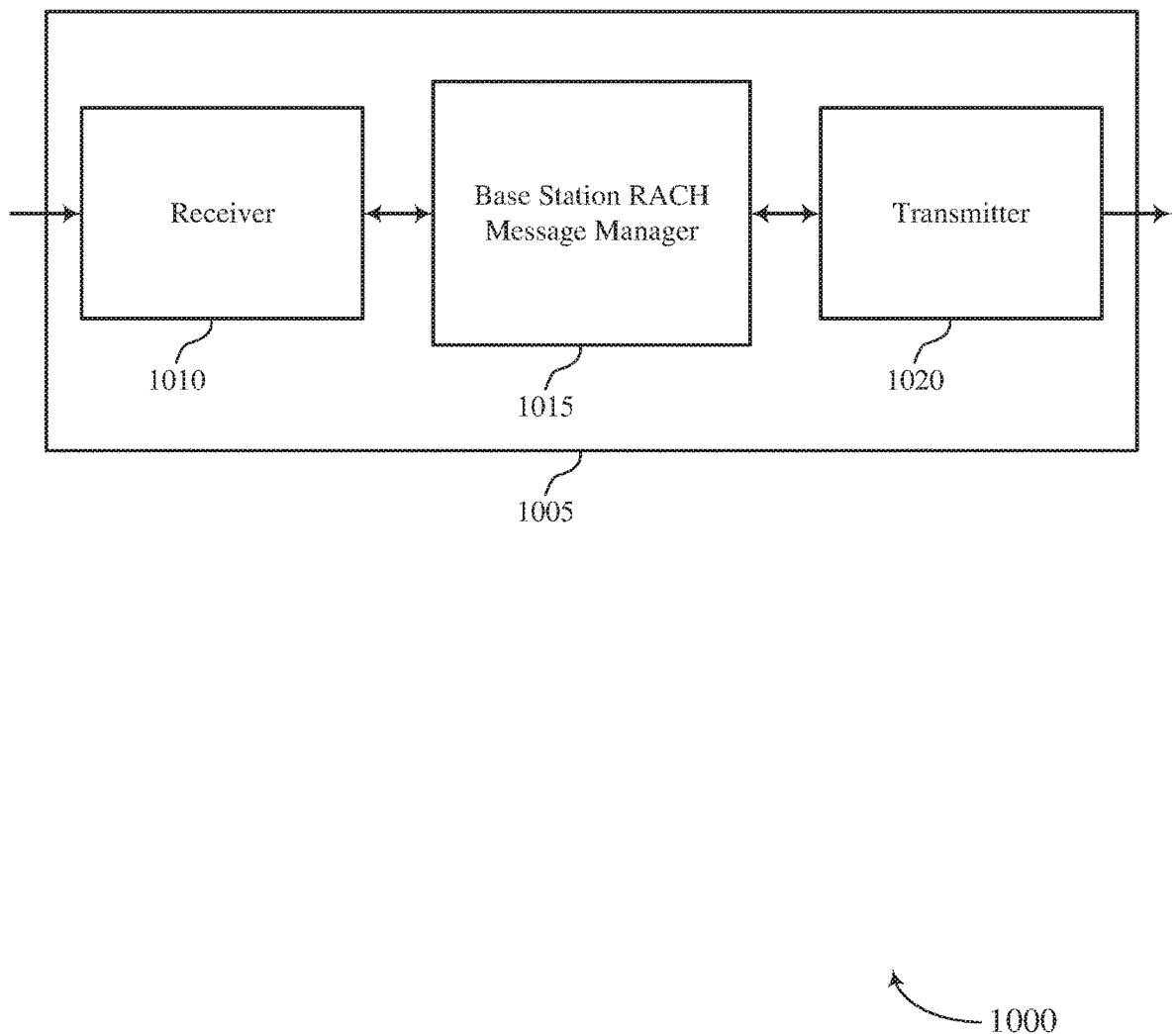
FIGS. 10 through 12 show block diagrams of a device that supports configurations for transmitting random access preamble messages in accordance with aspects of the present disclosure.

FIG. 10 shows a block diagram 1000 of a wireless device 1005 that supports configurations for transmitting random access preamble messages in accordance with aspects of the present disclosure. Wireless device 1005 may be an example of aspects of a base station 105 as described herein. Wireless device 1005 may include receiver 1010, base station RACH message manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to configurations for transmitting random access preamble messages, etc.). Information may be passed on to other components of the device. The receiver 1010 may be an example of aspects of the transceiver 1335 described with reference to FIG. 13. The receiver 1010 may utilize a single antenna or a set of antennas.

Base station RACH message manager 1015 may be an example of aspects of the base station RACH message manager 1315 described with reference to FIG. 13. Base station RACH message manager 1015 and/or at least some of its various sub-components may be implemented in hardware, software executed by a processor, firmware, or any combination thereof. If implemented in software executed by a processor, the functions of the base station RACH message manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station RACH message manager 1015 and/or at least some of its various sub-components may be physically located at various positions, including being distributed such that portions of functions are implemented at different physical locations by one or more physical devices. In some examples, base station RACH message manager 1015 and/or at least some of its various sub-components may be a separate and distinct component in accordance with various aspects of the present disclosure. In other examples, base station RACH message manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station RACH message manager 1015 may identify a configuration for transmitting a RACH preamble message repeatedly before an expiration of a RACH response window, where the configuration supports multiple transmissions of the RACH preamble message on a set of dedicated RACH resources and either single or multiple transmissions of the RACH preamble message on a set of common RACH resources. Base station RACH message manager 1015 may convey a configuration message indicating whether to transmit single or multiple transmissions of the RACH preamble message on the set of common RACH resources before the expiration of the RACH response window and may receive the RACH preamble message based on the configuration message.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
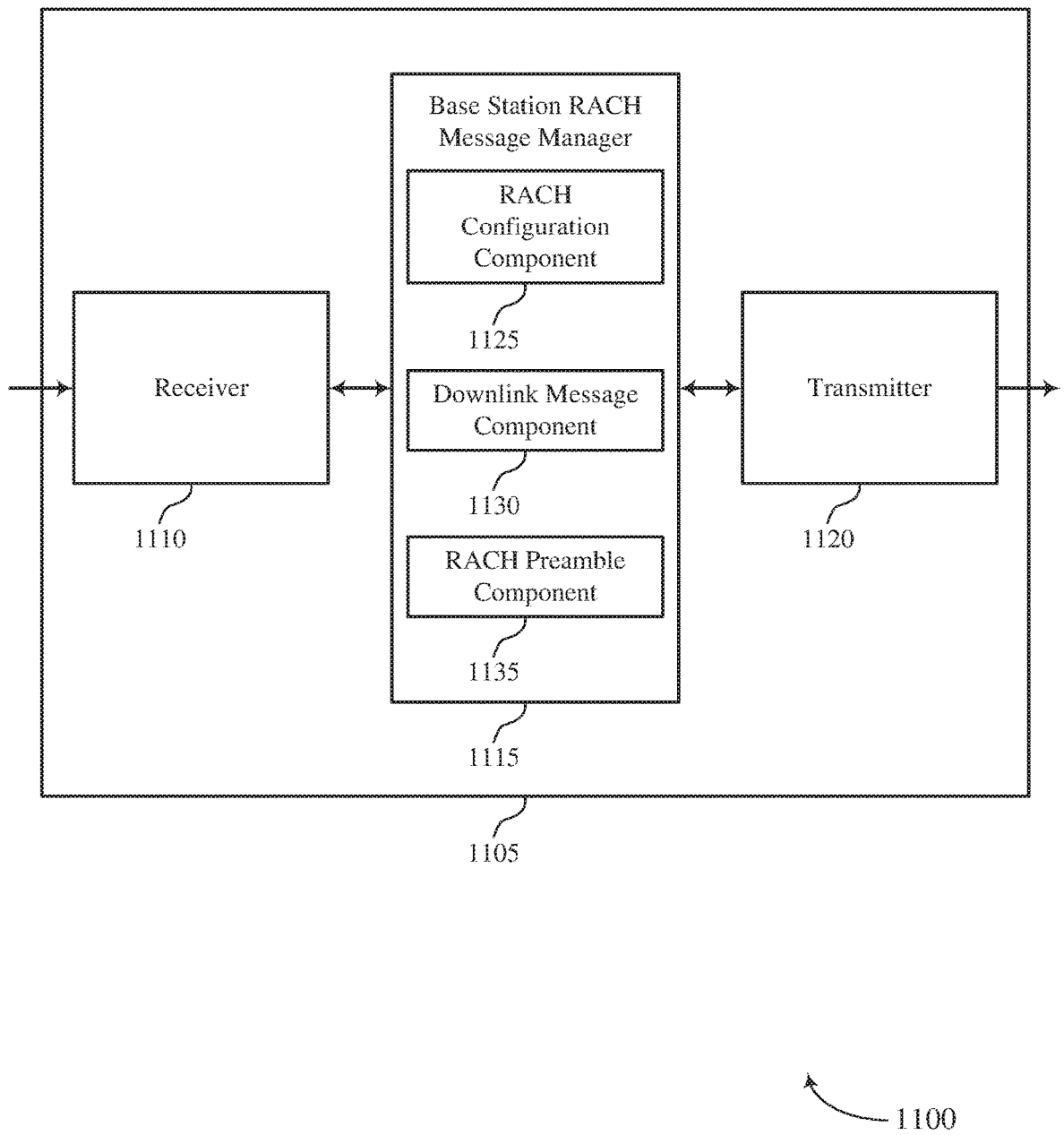

FIG. 11 shows a block diagram 1100 of a wireless device 1105 that supports configurations for transmitting random access preamble messages in accordance with aspects of the present disclosure. Wireless device 1105 may be an example of aspects of a wireless device 1005 or a base station 105 as described with reference to FIG. 10. Wireless device 1105 may include receiver 1110, base station RACH message manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to configurations for transmitting random access preamble messages, etc.). Information may be passed on to other components of the device. The receiver 1110 may be an example of aspects of the transceiver 1335 described with reference to FIG. 13. The receiver 1110 may utilize a single antenna or a set of antennas.

Base station RACH message manager 1115 may be an example of aspects of the base station RACH message manager 1315 described with reference to FIG. 13. Base station RACH message manager 1115 may also include RACH configuration component 1125, downlink message component 1130, and RACH preamble component 1135.

RACH configuration component 1125 may identify a configuration for transmitting a RACH preamble message repeatedly before an expiration of a RACH response window, where the configuration supports multiple transmissions of the RACH preamble message on a set of dedicated RACH resources and either single or multiple transmissions of the RACH preamble message on a set of common RACH resources.

Downlink message component 1130 may convey a configuration message indicating whether to transmit single or multiple transmissions of the RACH preamble message on the set of common RACH resources before the expiration of the RACH response window. In some cases, the configuration message is target-cell specific and is conveyed via a serving cell. In some cases, the configuration message is the same for all target cells and is conveyed via a serving cell. In some cases, the configuration message includes a broadcast message or an RRC message. In some cases, the configuration message is statically configured. In some cases, the configuration message includes a handover command. In some cases, the handover command is generated by a serving cell and transmitted to a network entity via the serving cell. RACH preamble component 1135 may receive the RACH preamble message based on the configuration message.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
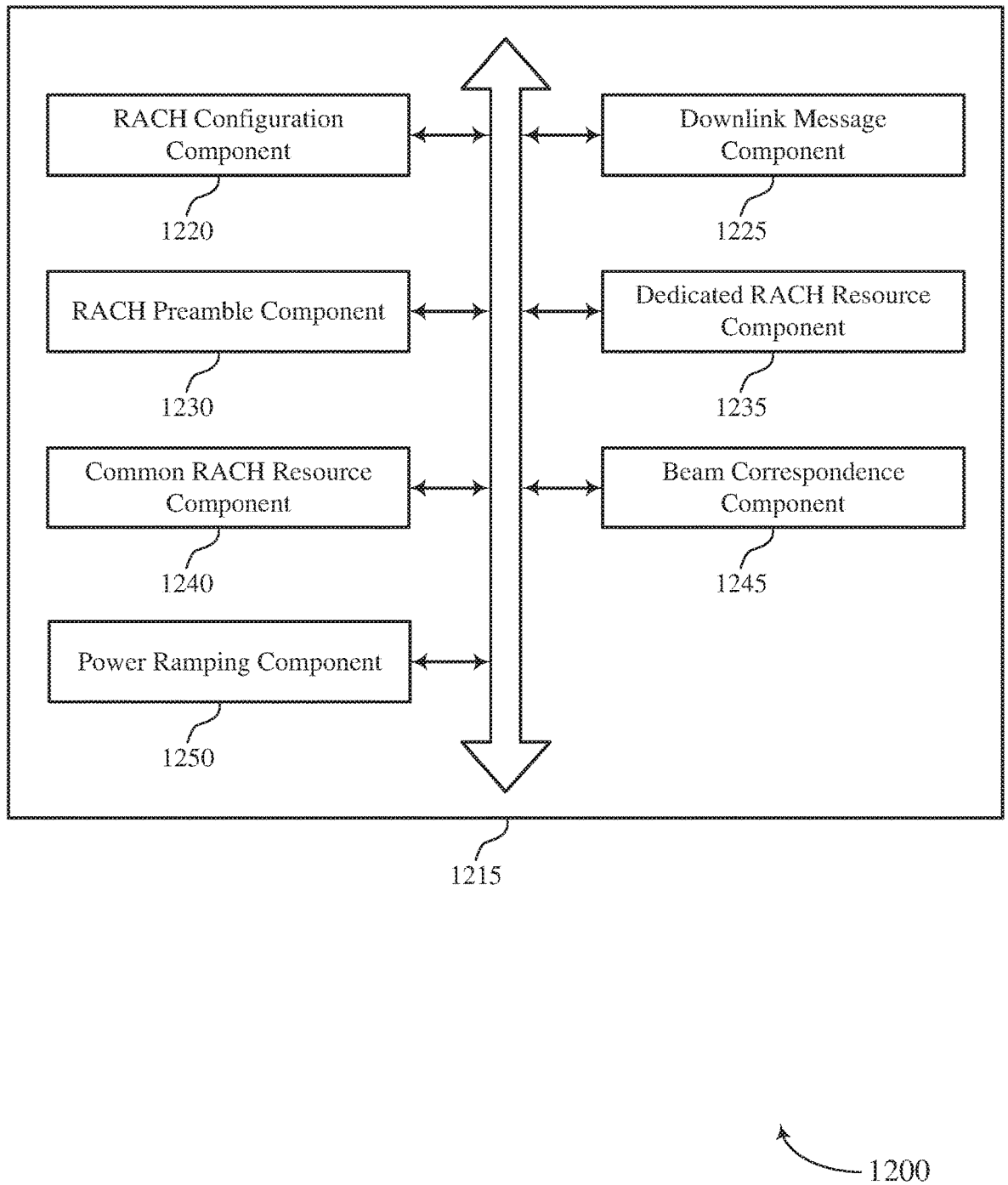

FIG. 12 shows a block diagram 1200 of a base station RACH message manager 1215 that supports configurations for transmitting random access preamble messages in accordance with aspects of the present disclosure. The base station RACH message manager 1215 may be an example of aspects of a base station RACH message manager 1315 described with reference to FIGS. 10, 11, and 13. The base station RACH message manager 1215 may include RACH configuration component 1220, downlink message component 1225, RACH preamble component 1230, dedicated RACH resource component 1235, common RACH resource component 1240, and beam correspondence component 1245. Each of these modules may communicate, directly or indirectly, with one another (e.g., via one or more buses).

RACH configuration component 1220 may identify a configuration for transmitting a RACH preamble message repeatedly before an expiration of a RACH response window, where the configuration supports multiple transmissions of the RACH preamble message on a set of dedicated RACH resources and either single or multiple transmissions of the RACH preamble message on a set of common RACH resources.

Downlink message component 1225 may convey a configuration message indicating whether to transmit single or multiple transmissions of the RACH preamble message on the set of common RACH resources before the expiration of the RACH response window. In some cases, the configuration message is target-cell specific and is conveyed via a serving cell. In some cases, the configuration message is the same for all target cells and is conveyed via a serving cell. In some cases, the configuration message includes a broadcast message or an RRC message. In some cases, the configuration message is statically configured. In some cases, the configuration message includes a handover command. In some cases, the handover command is generated by a serving cell and transmitted to a network entity via the serving cell.

RACH preamble component 1230 may receive the RACH preamble message based on the configuration message. Dedicated RACH resource component 1235 may receive the RACH preamble message on the set of dedicated RACH resources a first time on a first uplink transmit beam and may receive the RACH preamble message on the set of dedicated RACH resources a second time on the first or a second uplink transmit beam before the expiration of the RACH response window. In some cases, the first and second uplink transmit beams are the same. In some cases, the set of dedicated RACH resources include time resources, frequency resources, preamble sequence resources, or a combination thereof. In some cases, the set of dedicated RACH resources are associated with a contention free random access procedure.

In some cases, common RACH resource component 1240 may receive the RACH preamble message on the set of common RACH resources once on a first uplink transmit beam before the expiration of the RACH response window and may receive the RACH preamble message on the set of common RACH resources on a second uplink transmit beam after the expiration of the RACH response window. In other cases, common RACH resource component 1240 may receive the RACH preamble message on the set of common RACH resources a first time on a first uplink transmit beam and may receive the RACH preamble message on the set of common RACH resources a second time on a second uplink transmit beam before the expiration of the RACH response window. In some cases, the first and second reception of the RACH preamble message on the set of common RACH resources correspond to different uplink reception beams.

Beam correspondence component 1245 may transmit a beam correspondence message that indicates a correspondence between an uplink reception beam and an uplink transmit beam.

Power ramping component 1250 may identify a power ramping procedure based on the identified configuration and convey information indicating the power ramping procedure (e.g., in a power ramping message). The information may include or be an example of a MIB, a SIB, an MSIB, RMSI, a handover message, or some combination of these. In some cases, power ramping component 1250 may identify a first power ramping procedure corresponding to the multiple transmissions of the RACH preamble message on the set of dedicated resources, may identify a second power ramping procedure corresponding to either the single or multiple transmissions of the RACH preamble message on the set of common RACH resources based on the identified configuration, and may convey both the first and second power ramping procedures (e.g., in a same power ramping message or in different power ramping messages). In some cases, the power ramping procedure may correspond to either transmitting the RACH preamble message on the set of dedicated RACH resources or on the set of common RACH resources.

Figure 13:
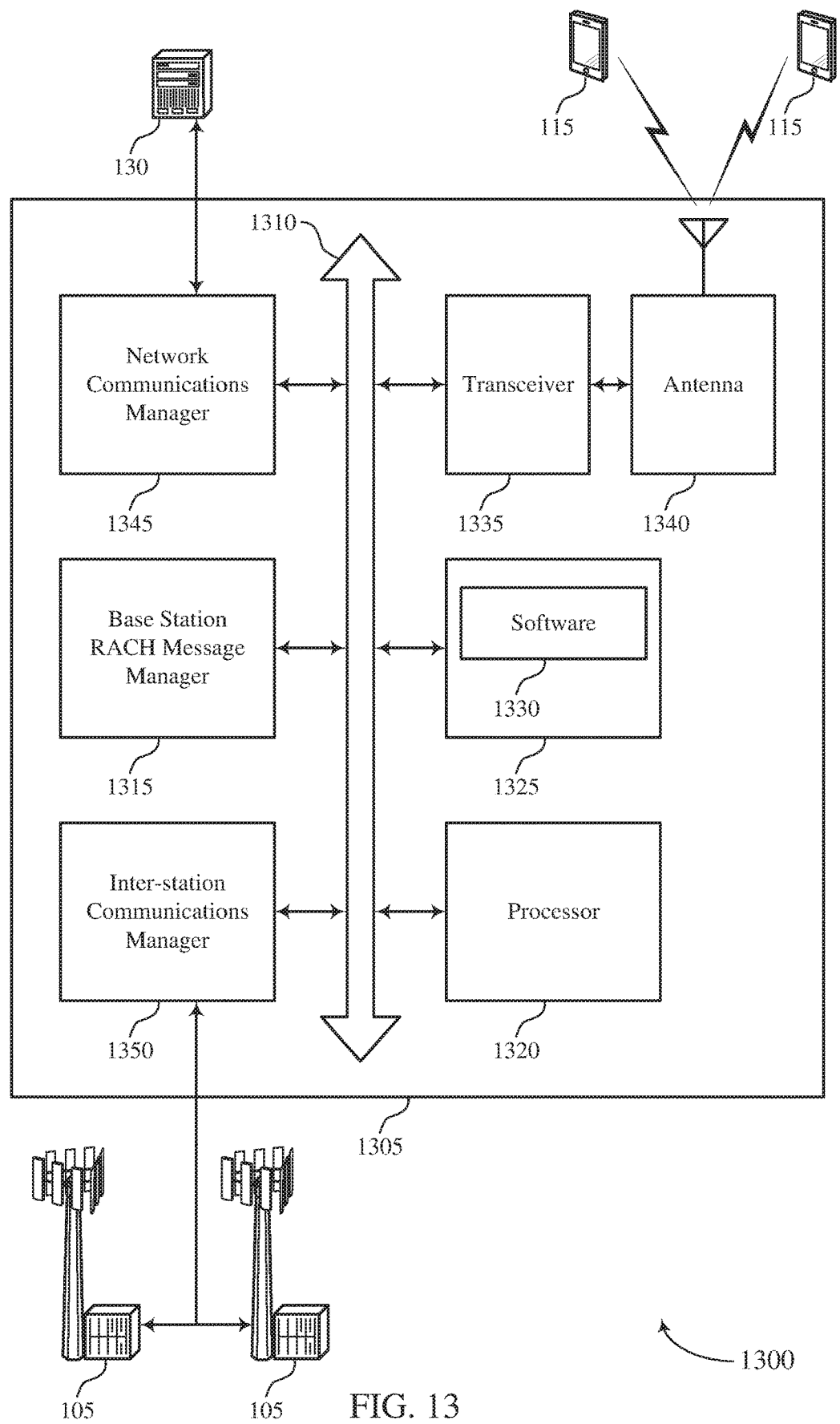
FIG. 13 illustrates a block diagram of a system including a base station that supports configurations for transmitting random access preamble messages in accordance with aspects of the present disclosure.

FIG. 13 shows a diagram of a system 1300 including a device 1305 that supports configurations for transmitting random access preamble messages in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station RACH message manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting configurations for transmitting random access preamble messages).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support configurations for transmitting random access preamble messages. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105 and may include a controller or scheduler for controlling communications with UEs 115 in cooperation with other base stations 105. For example, the inter-station communications manager 1350 may coordinate scheduling for transmissions to UEs 115 for various interference mitigation techniques such as beam-forming or joint transmission. In some examples, inter-station communications manager 1350 may provide an X2 interface within a Long Term Evolution (LTE)/LTE-A wireless communication network technology to provide communication between base stations 105.

Figure 14:
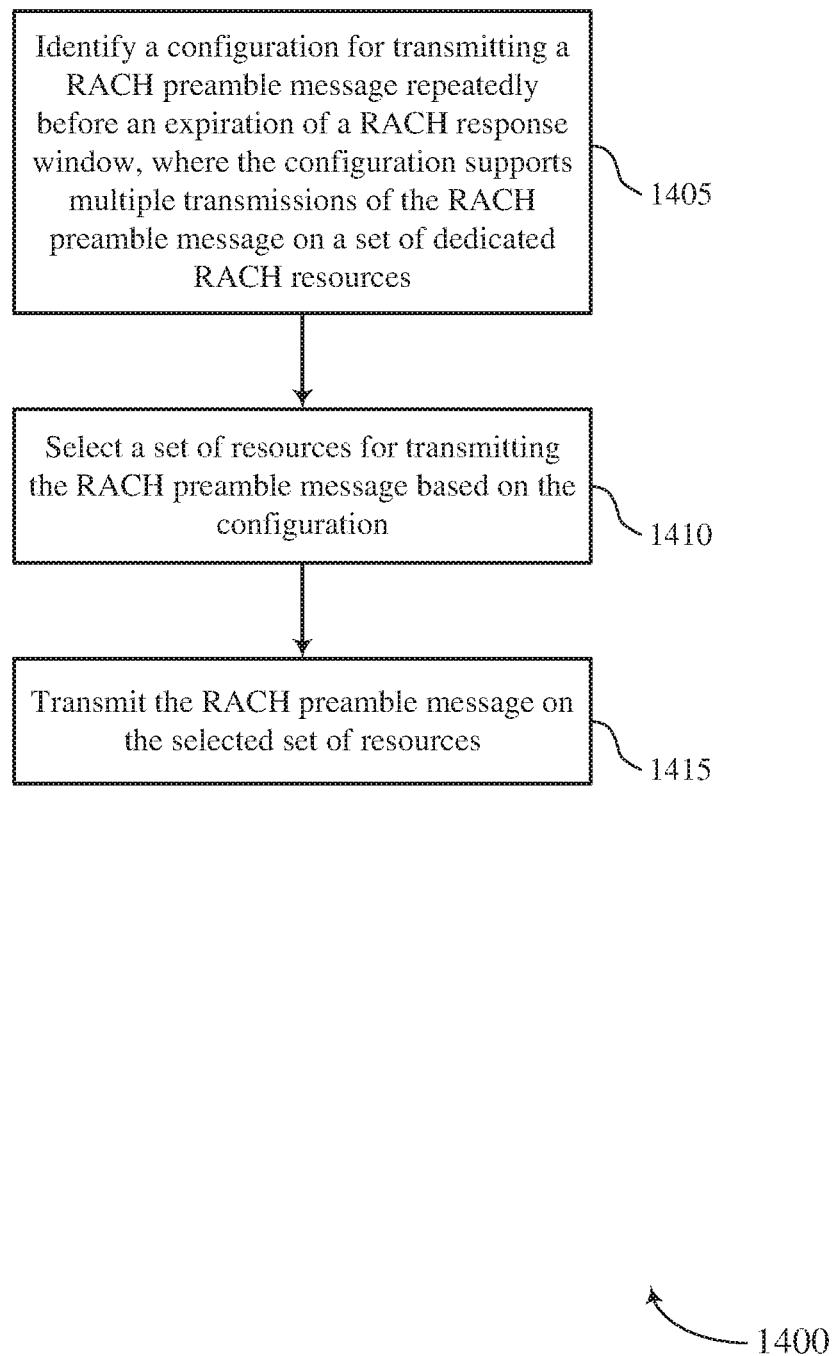
FIGS. 14 through 21 illustrate methods for configurations for transmitting random access preamble messages in accordance with aspects of the present disclosure.

FIG. 14 shows a flowchart illustrating a method 1400 for configurations for transmitting random access preamble messages in accordance with aspects of the present disclosure. The operations of method 1400 may be implemented by a UE 115 or its components as described herein. For example, the operations of method 1400 may be performed by a UE RACH message manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may identify a configuration for transmitting a RACH preamble message repeatedly before an expiration of a RACH response window, wherein the configuration supports multiple transmissions of the RACH preamble message on a set of dedicated RACH resources. The configuration may also support either single or multiple transmissions of the RACH preamble message on a set of common RACH resources. The operations of block 1405 may be performed according to the methods described herein. In certain examples, aspects of the operations of block 1405 may be performed by a RACH configuration component as described with reference to FIGS. 6 through 9.

At block 1410 the UE 115 may select a set of resources for transmitting the RACH preamble message based at least in part on the configuration. The operations of block 1410 may be performed according to the methods described herein. In certain examples, aspects of the operations of block 1410 may be performed by a resource selection component as described with reference to FIGS. 6 through 9.

At block 1415 the UE 115 may transmit the RACH preamble message on the selected set of resources. The operations of block 1415 may be performed according to the methods described herein. In certain examples, aspects of the operations of block 1415 may be performed by a RACH preamble component as described with reference to FIGS. 6 through 9.

Figure 15:
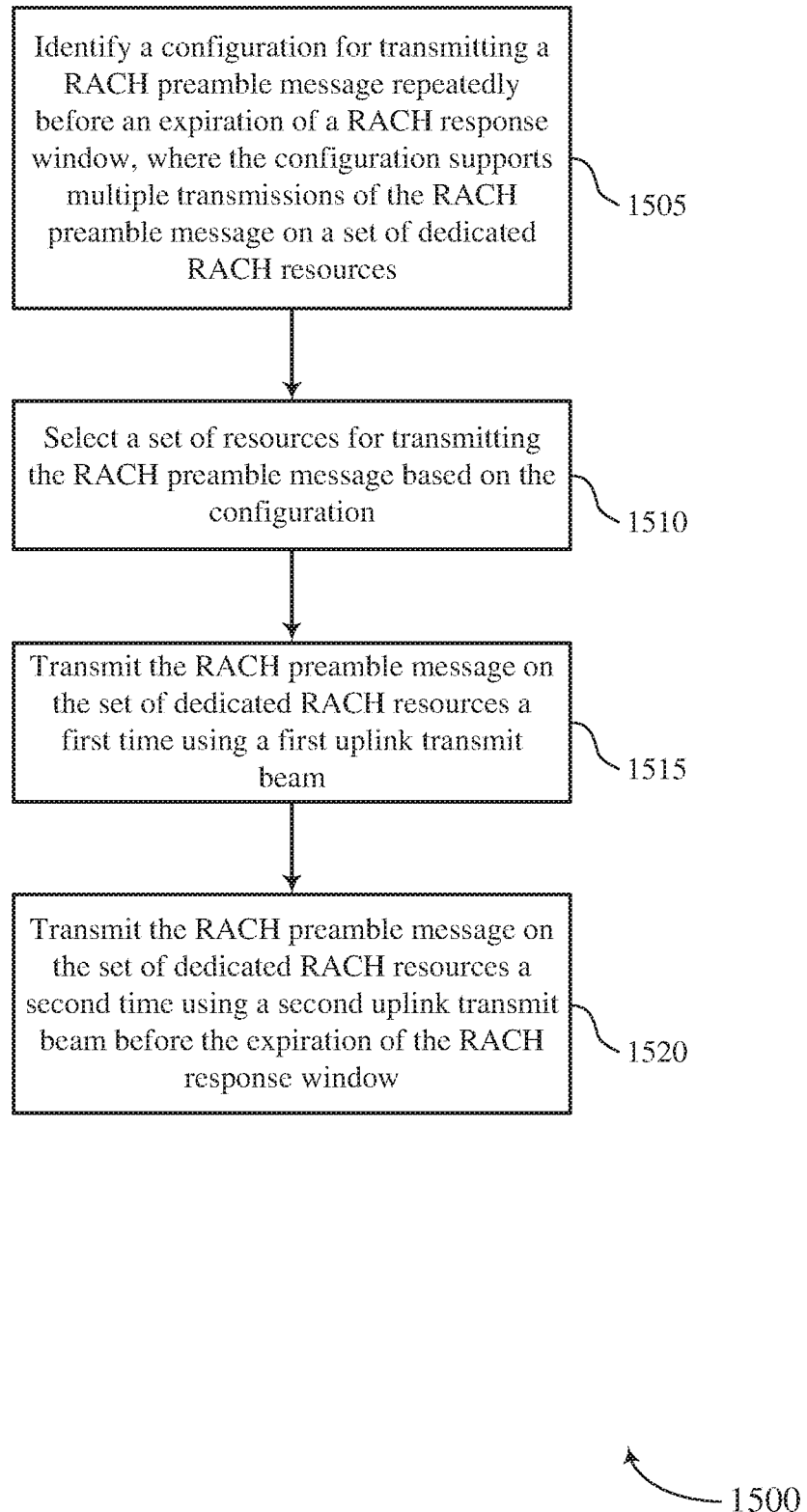

FIG. 15 shows a flowchart illustrating a method 1500 for configurations for transmitting random access preamble messages in accordance with aspects of the present disclosure. The operations of method 1500 may be implemented by a UE 115 or its components as described herein. For example, the operations of method 1500 may be performed by a UE RACH message manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may identify a configuration for transmitting a RACH preamble message repeatedly before an expiration of a RACH response window, wherein the configuration supports multiple transmissions of the RACH preamble message on a set of dedicated RACH resources. The configuration may also support either single or multiple transmissions of the RACH preamble message on a set of common RACH resources. The operations of block 1505 may be performed according to the methods described herein. In certain examples, aspects of the operations of block 1505 may be performed by a RACH configuration component as described with reference to FIGS. 6 through 9.

At block 1510 the UE 115 may select a set of resources for transmitting the RACH preamble message based at least in part on the configuration. The operations of block 1510 may be performed according to the methods described herein. In certain examples, aspects of the operations of block 1510 may be performed by a resource selection component as described with reference to FIGS. 6 through 9.

At block 1515 the UE 115 may transmit the RACH preamble message on the set of dedicated RACH resources a first time using a first uplink transmit beam. The operations of block 1515 may be performed according to the methods described herein. In certain examples, aspects of the operations of block 1515 may be performed by a dedicated RACH resource component as described with reference to FIGS. 6 through 9.

At block 1520 the UE 115 may transmit the RACH preamble message on the set of dedicated RACH resources a second time using a second uplink transmit beam before the expiration of the RACH response window. The operations of block 1520 may be performed according to the methods described herein. In certain examples, aspects of the operations of block 1520 may be performed by a dedicated RACH resource component as described with reference to FIGS. 6 through 9.

Figure 16:
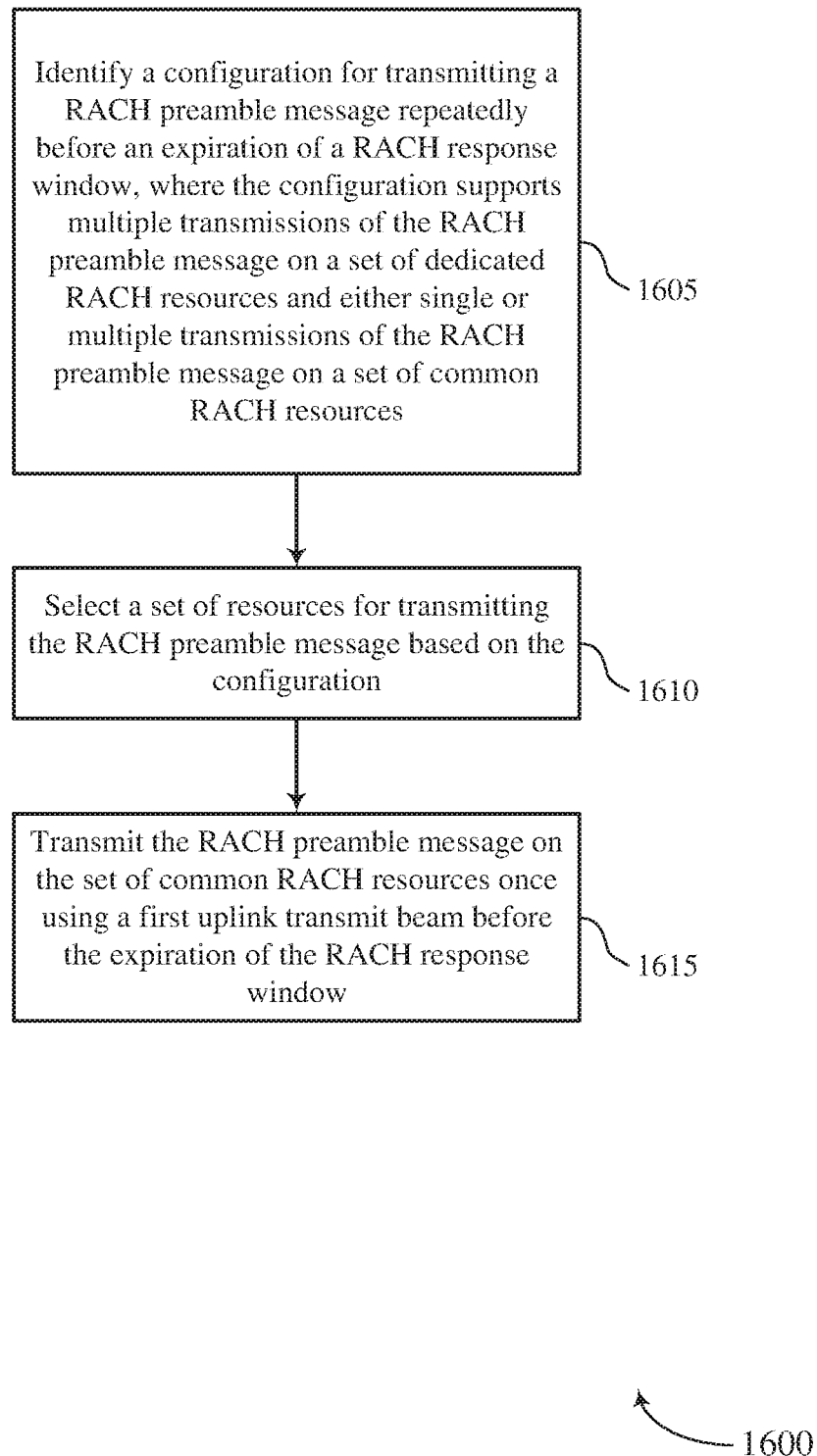

FIG. 16 shows a flowchart illustrating a method 1600 for configurations for transmitting random access preamble messages in accordance with aspects of the present disclosure. The operations of method 1600 may be implemented by a UE 115 or its components as described herein. For example, the operations of method 1600 may be performed by a UE RACH message manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may identify a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources. The operations of block 1605 may be performed according to the methods described herein. In certain examples, aspects of the operations of block 1605 may be performed by a RACH configuration component as described with reference to FIGS. 6 through 9.

At block 1610 the UE 115 may select a set of resources for transmitting the RACH preamble message based at least in part on the configuration. The operations of block 1610 may be performed according to the methods described herein. In certain examples, aspects of the operations of block 1610 may be performed by a resource selection component as described with reference to FIGS. 6 through 9.

At block 1615 the UE 115 may transmit the RACH preamble message on the set of common RACH resources once using a first uplink transmit beam before the expiration of the RACH response window. The operations of block 1615 may be performed according to the methods described herein. In certain examples, aspects of the operations of block 1615 may be performed by a common RACH resource component as described with reference to FIGS. 6 through 9.

Figure 17:
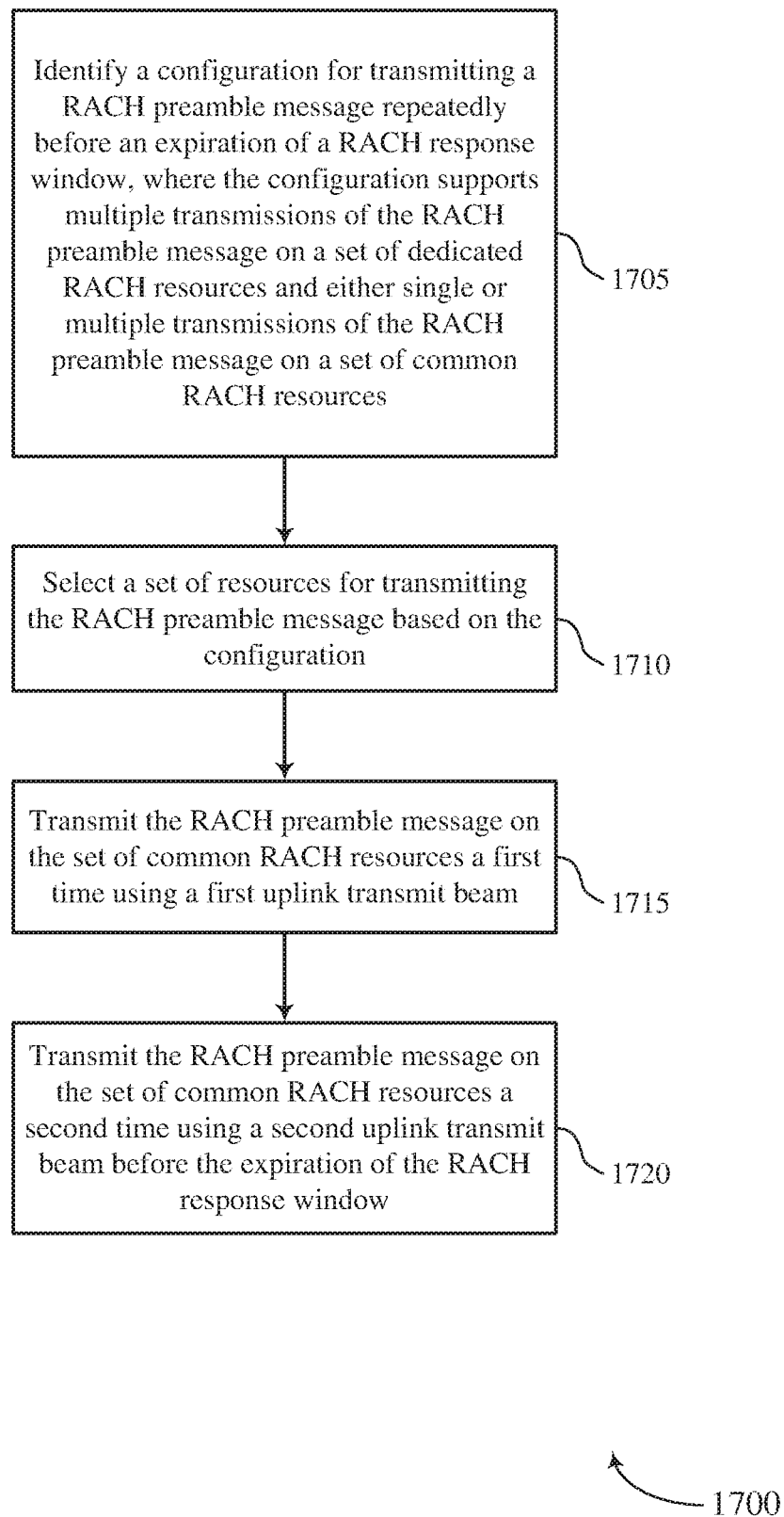

FIG. 17 shows a flowchart illustrating a method 1700 for configurations for transmitting random access preamble messages in accordance with aspects of the present disclosure. The operations of method 1700 may be implemented by a UE 115 or its components as described herein. For example, the operations of method 1700 may be performed by a UE RACH message manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources. The operations of block 1705 may be performed according to the methods described herein. In certain examples, aspects of the operations of block 1705 may be performed by a RACH configuration component as described with reference to FIGS. 6 through 9.

At block 1710 the UE 115 may select a set of resources for transmitting the RACH preamble message based at least in part on the configuration. The operations of block 1710 may be performed according to the methods described herein. In certain examples, aspects of the operations of block 1710 may be performed by a resource selection component as described with reference to FIGS. 6 through 9.

At block 1715 the UE 115 may transmit the RACH preamble message on the set of common RACH resources a first time using a first uplink transmit beam. The operations of block 1715 may be performed according to the methods described herein. In certain examples, aspects of the operations of block 1715 may be performed by a common RACH resource component as described with reference to FIGS. 6 through 9.

At block 1720 the UE 115 may transmit the RACH preamble message on the set of common RACH resources a second time using a second uplink transmit beam before the expiration of the RACH response window. The operations of block 1720 may be performed according to the methods described herein. In certain examples, aspects of the operations of block 1720 may be performed by a common RACH resource component as described with reference to FIGS. 6 through 9.

Figure 18:
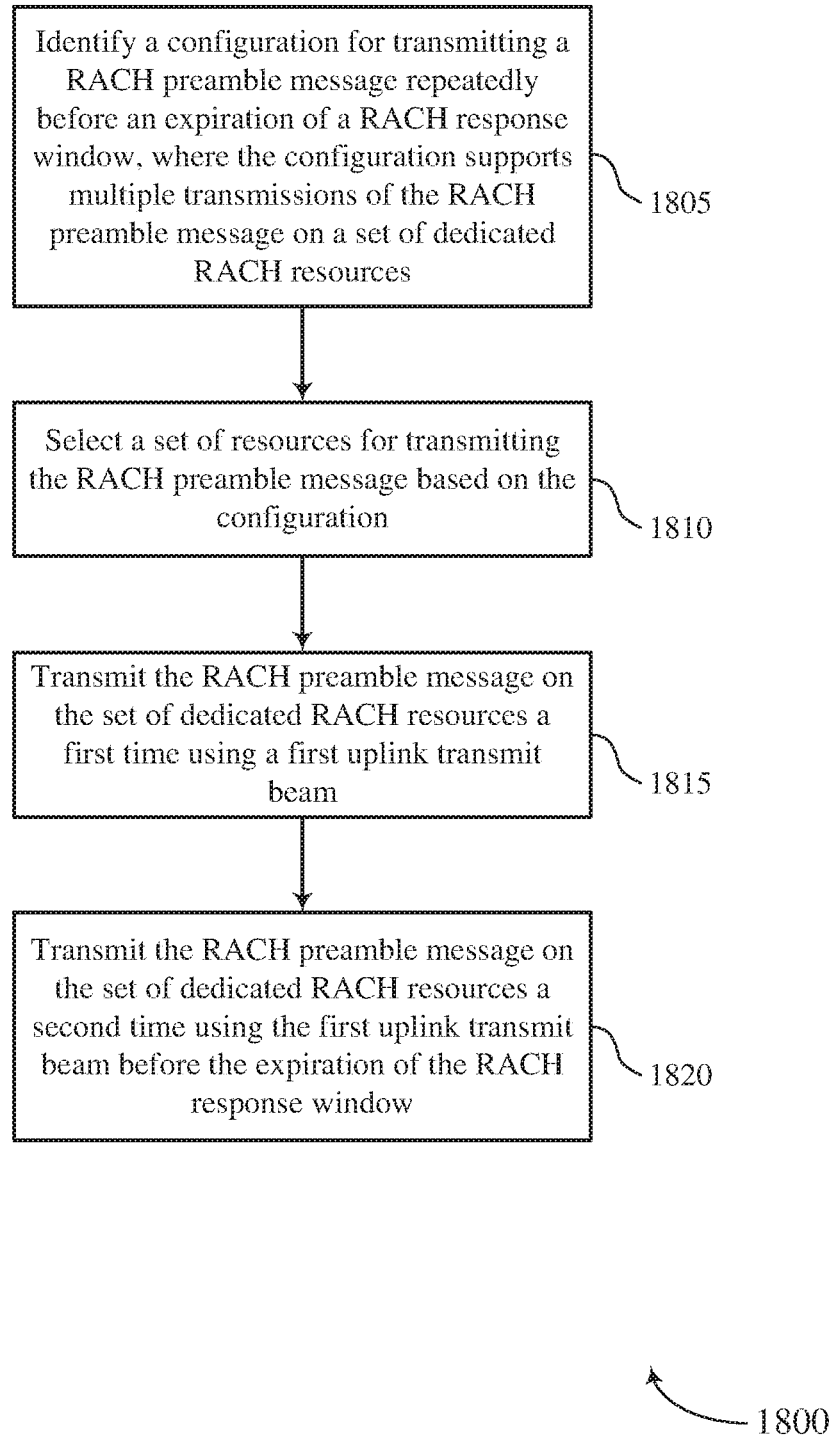

FIG. 18 shows a flowchart illustrating a method 1800 for configurations for transmitting random access preamble messages in accordance with aspects of the present disclosure. The operations of method 1800 may be implemented by a UE 115 or its components as described herein. For example, the operations of method 1800 may be performed by a UE RACH message manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may identify a configuration for transmitting a RACH preamble message repeatedly before an expiration of a RACH response window, wherein the configuration supports multiple transmissions of the RACH preamble message on a set of dedicated RACH resources. The configuration may also support either single or multiple transmissions of the RACH preamble message on a set of common RACH resources. The operations of block 1805 may be performed according to the methods described herein. In certain examples, aspects of the operations of block 1805 may be performed by a RACH configuration component as described with reference to FIGS. 6 through 9.

At block 1810 the UE 115 may select a set of resources for transmitting the RACH preamble message based at least in part on the configuration. The operations of block 1810 may be performed according to the methods described herein. In certain examples, aspects of the operations of block 1810 may be performed by a resource selection component as described with reference to FIGS. 6 through 9.

At block 1815 the UE 115 may transmit the RACH preamble message on the set of dedicated RACH resources a first time using a first uplink transmit beam. The operations of block 1815 may be performed according to the methods described herein. In certain examples, aspects of the operations of block 1815 may be performed by a dedicated RACH resource component as described with reference to FIGS. 6 through 9.

At block 1820 the UE 115 may transmit the RACH preamble message on the set of dedicated RACH resources a second time using the first uplink transmit beam before the expiration of the RACH response window. The operations of block 1820 may be performed according to the methods described herein. In certain examples, aspects of the operations of block 1820 may be performed by a dedicated RACH resource component as described with reference to FIGS. 6 through 9.

Figure 19:
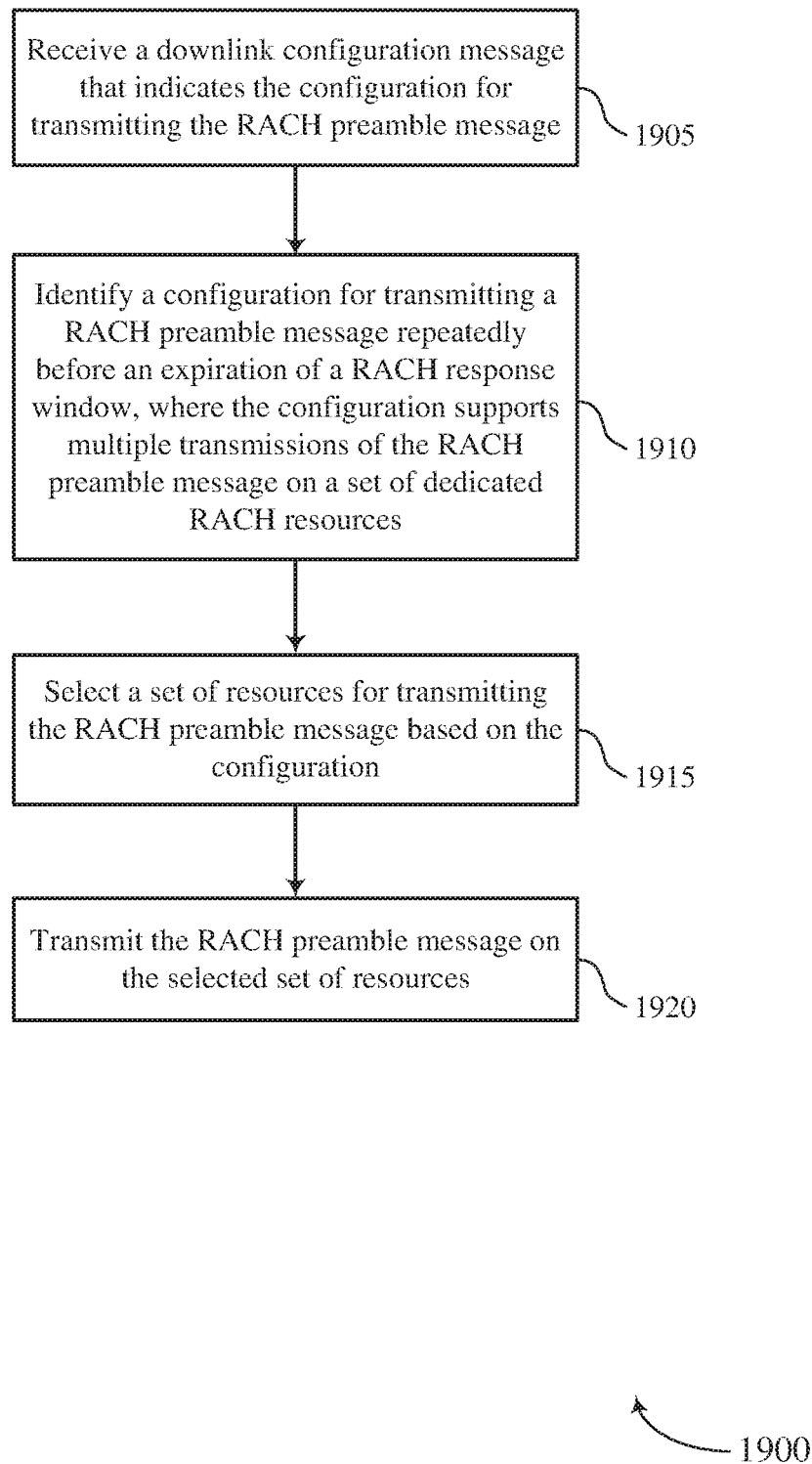

FIG. 19 shows a flowchart illustrating a method 1900 for configurations for transmitting random access preamble messages in accordance with aspects of the present disclosure. The operations of method 1900 may be implemented by a UE 115 or its components as described herein. For example, the operations of method 1900 may be performed by a UE RACH message manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive a downlink configuration message that indicates the configuration for transmitting the RACH preamble message. The operations of block 1905 may be performed according to the methods described herein. In certain examples, aspects of the operations of block 1905 may be performed by a downlink message component as described with reference to FIGS. 6 through 9.

At block 1910 the UE 115 may identify a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources. The operations of block 1910 may be performed according to the methods described herein. In certain examples, aspects of the operations of block 1910 may be performed by a RACH configuration component as described with reference to FIGS. 6 through 9.

At block 1915 the UE 115 may select a set of resources for transmitting the RACH preamble message based at least in part on the configuration. The operations of block 1915 may be performed according to the methods described herein. In certain examples, aspects of the operations of block 1915 may be performed by a resource selection component as described with reference to FIGS. 6 through 9.

At block 1920 the UE 115 may transmit the RACH preamble message on the selected set of resources. The operations of block 1920 may be performed according to the methods described herein. In certain examples, aspects of the operations of block 1920 may be performed by a RACH preamble component as described with reference to FIGS. 6 through 9.

Figure 20:
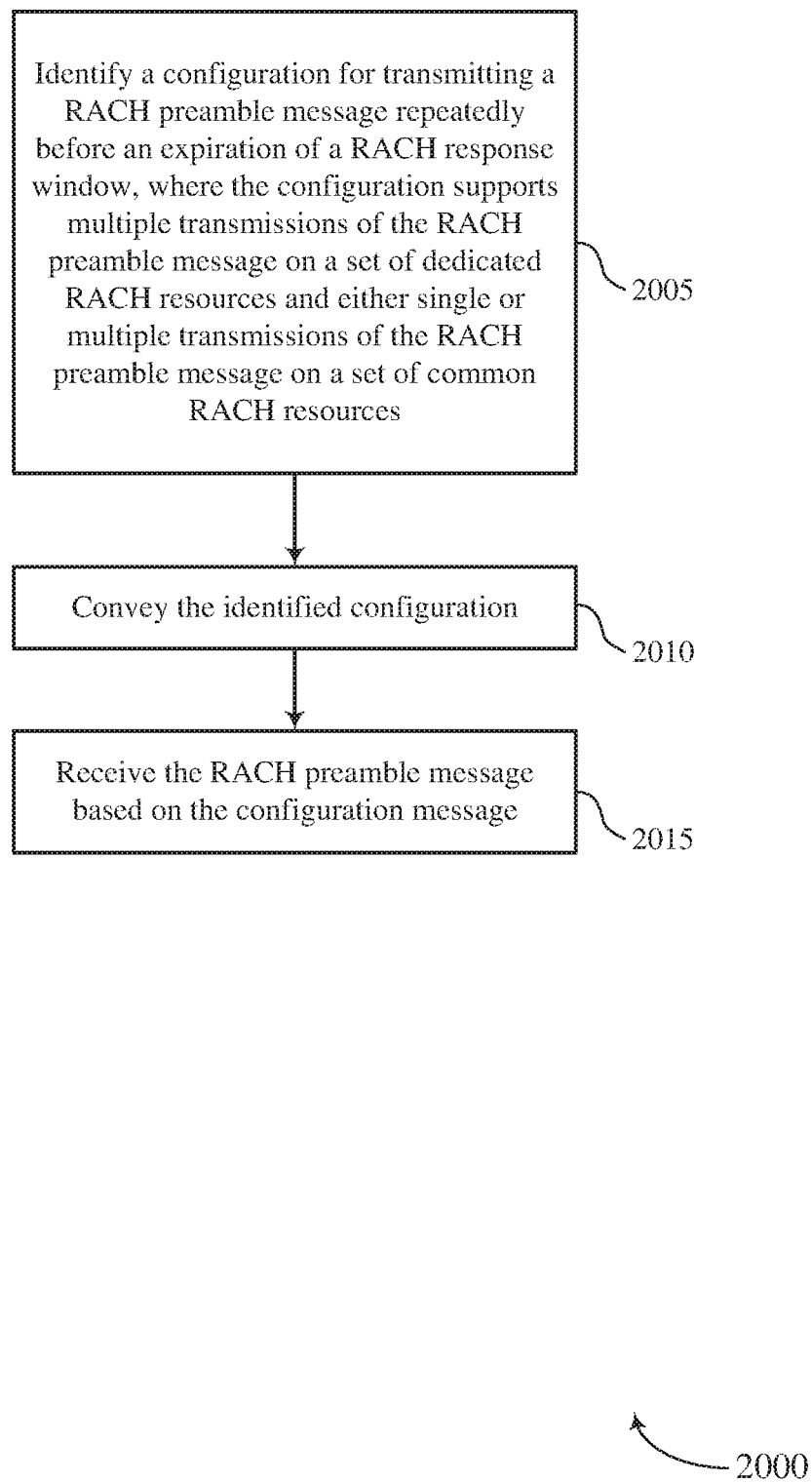

FIG. 20 shows a flowchart illustrating a method 2000 for configurations for transmitting random access preamble messages in accordance with aspects of the present disclosure. The operations of method 2000 may be implemented by a base station 105 or its components as described herein. For example, the operations of method 2000 may be performed by a base station RACH message manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may identify a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources. The operations of block 2005 may be performed according to the methods described herein. In certain examples, aspects of the operations of block 2005 may be performed by a RACH configuration component as described with reference to FIGS. 10 through 13.

At block 2010 the base station 105 may convey the identified configuration. For example, base station 105 may convey a configuration message indicating whether to transmit single or multiple transmissions of the RACH preamble message on the set of common RACH resources before the expiration of the RACH response window. The operations of block 2010 may be performed according to the methods described herein. In certain examples, aspects of the operations of block 2010 may be performed by a downlink message component as described with reference to FIGS. 10 through 13.

At block 2015 the base station 105 may receive the RACH preamble message based at least in part on the configuration message. The operations of block 2015 may be performed according to the methods described herein. In certain examples, aspects of the operations of block 2015 may be performed by a RACH preamble component as described with reference to FIGS. 10 through 13.

Figure 21:
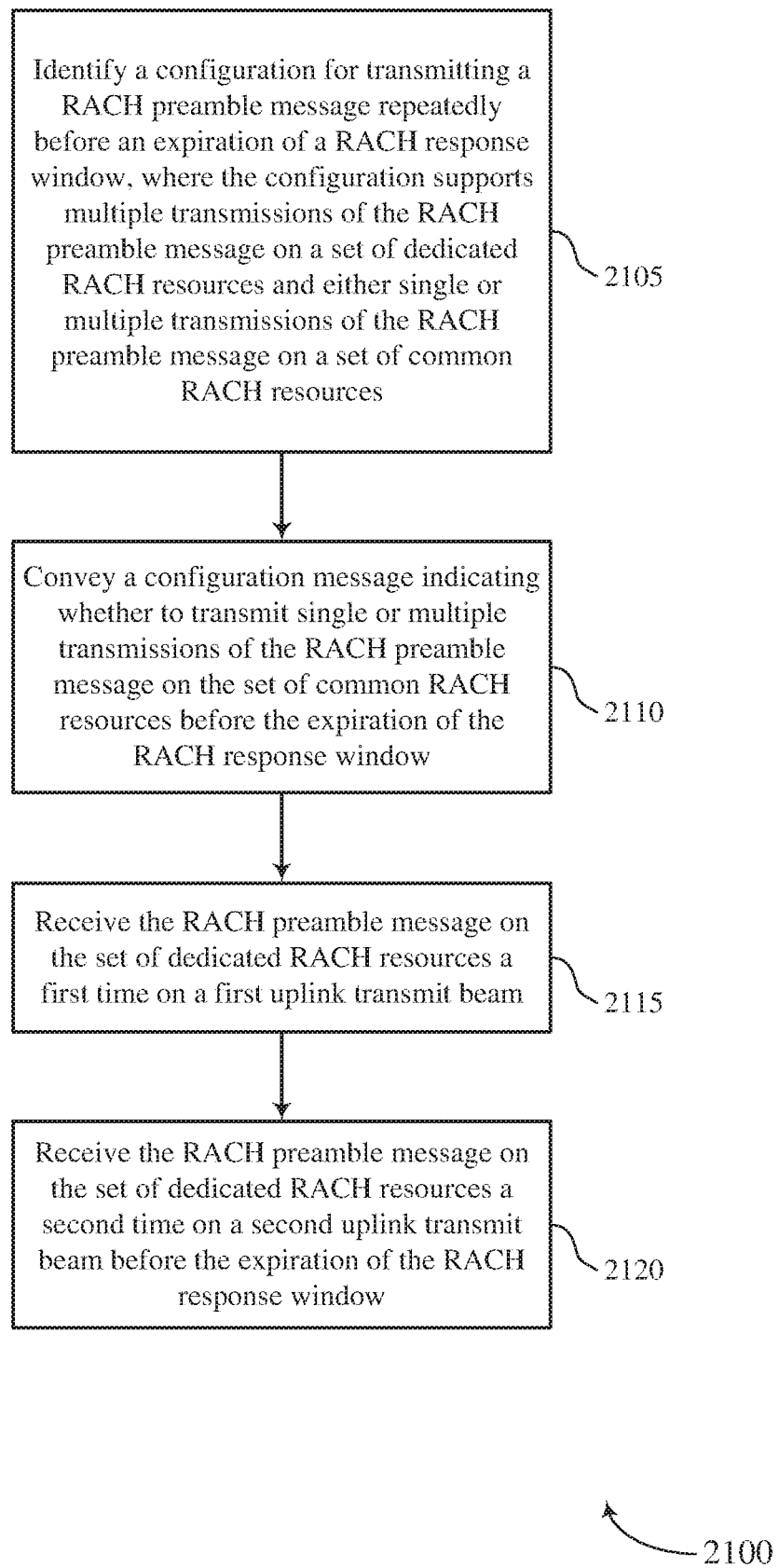

FIG. 21 shows a flowchart illustrating a method 2100 for configurations for transmitting random access preamble messages in accordance with aspects of the present disclosure. The operations of method 2100 may be implemented by a base station 105 or its components as described herein. For example, the operations of method 2100 may be performed by a base station RACH message manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may identify a configuration for transmitting a RACH preamble message repeatedly before an expiration of a RACH response window, wherein the configuration supports multiple transmissions of the RACH preamble message on a set of dedicated RACH resources and either single or multiple transmissions of the RACH preamble message on a set of common RACH resources. The operations of block 2105 may be performed according to the methods described herein. In certain examples, aspects of the operations of block 2105 may be performed by a RACH configuration component as described with reference to FIGS. 10 through 13.

At block 2110 the base station 105 may convey a configuration message indicating whether to transmit single or multiple transmissions of the RACH preamble message on the set of common RACH resources before the expiration of the RACH response window. The operations of block 2110 may be performed according to the methods described herein. In certain examples, aspects of the operations of block 2110 may be performed by a downlink message component as described with reference to FIGS. 10 through 13.

At block 2115 the base station 105 may receive the RACH preamble message on the set of dedicated RACH resources a first time on a first uplink transmit beam. The operations of block 2115 may be performed according to the methods described herein. In certain examples, aspects of the operations of block 2115 may be performed by a dedicated RACH resource component as described with reference to FIGS. 10 through 13.

At block 2120 the base station 105 may receive the RACH preamble message on the set of dedicated RACH resources a second time on a second uplink transmit beam before the expiration of the RACH response window. The operations of block 2120 may be performed according to the methods described herein. In certain examples, aspects of the operations of block 2120 may be performed by a dedicated RACH resource component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   one or more processors;
   memory coupled with the one or more processors; and
   instructions stored in the memory, the one or more processors configured to:
      receive, from a network entity, signaling that indicates a configuration for a repeated transmission of a random access channel (RACH) preamble message before an expiration of a RACH response window during a single RACH transmission occasion, wherein the configuration supports multiple transmissions of the RACH preamble message via a set of dedicated RACH resources comprising a first plurality of symbols, each symbol of the first plurality of symbols associated with a corresponding reception beam of the network entity, the signaling further indicating a threshold quantity of RACH preamble messages for transmission via the set of dedicated RACH resources;

select a set of resources from the set of dedicated RACH resources for transmitting the RACH preamble message based at least in part on the configurationfor the UE;

transmit, in accordance with the threshold quantity of RACH preamble messages for transmission via the set of dedicated RACH resources, a first plurality of signals comprising the RACH preamble message via the selected set of resources using a first plurality of uplink transmit beams before the expiration of the RACH response window;

transmit at least a second signal comprising the RACH preamble message via at least one resource of a periodic set of common RACH resources using at least one uplink transmit beam before the expiration of the RACH response window, wherein the periodic set of common RACH resources comprises a second plurality of symbols, each symbol of the second plurality of symbols associated with a second corresponding reception beam of the network entity; and receive a RACH response to the RACH preamble message before the expiration of the RACH response window.

2. The apparatus of claim 1, wherein the configuration supports either single or multiple transmissions of the RACH preamble message via the periodic set of common RACH resources common to a plurality of UEs for RACH transmission, wherein the periodic set of common RACH resources comprise time resources, frequency resources, preamble sequence resources, or a combination thereof associated with a contention based random access procedure for the plurality of UEs.

3. The method of claim 2, wherein, to transmit the first plurality of signals comprising the RACH preamble message, the one or more processors are configured to:
transmit the RACH preamble message via a first resource of the set of dedicated RACH resources corresponding to a first uplink reception beam; and
transmit the RACH preamble message via a second resource of the set of dedicated RACH resources corresponding to a second uplink reception beam.

4. The apparatus of claim 2, wherein, to transmit at least the second signal comprising the RACH preamble message, the one or more processors are configured to:
transmit the RACH preamble message via the periodic set of common RACH resources once using a first uplink transmit beam before the expiration of the RACH response window.

5. The apparatus of claim 4, wherein the one or more processors are configured to:
transmit the RACH preamble message via the periodic set of common RACH resources using a second uplink transmit beam after the expiration of the RACH response window.

6. The apparatus of claim 5, wherein transmitting the RACH preamble message via the periodic set of common RACH resources using the first uplink transmit beam and using the second uplink transmit beam correspond to different uplink reception beams.

7. The apparatus of claim 2, wherein, to receive the signaling that indicates the configuration, the one or more processors are configured to:
receive a downlink configuration message that indicates the configuration for the repeated transmission of the RACH preamble message.

8. The apparatus of claim 7, wherein the downlink configuration message indicates whether to transmit single or multiple transmissions of the RACH preamble message via the periodic set of common RACH resources before the expiration of the RACH response window.

9. The apparatus of claim 7, wherein the downlink configuration message comprises a broadcast message or a radio resource control (RRC) message.

10. The apparatus of claim 7, wherein the downlink configuration message comprises a handover command.

11. The apparatus of claim 10, wherein the handover command is generated by a serving cell and transmitted to a network entity via the serving cell.

12. The apparatus of claim 2, wherein the one or more processors are configured to:
identify a power ramping procedure based at least in part on the configuration.

13. The apparatus of claim 12, wherein the one or more processors are configured to:
receive information indicating the power ramping procedure, wherein the information is conveyed via a master information block (MIB), a system information block (SIB), a master system information block (MSIB), remaining minimum system information (RMSI), a handover message, or a combination thereof.

14. The apparatus of claim 12, wherein the power ramping procedure is further based at least in part on whether a correspondence exists between a transmit beam and a reception beam.

15. The apparatus of claim 12, wherein the power ramping procedure is further based at least in part on whether the RACH preamble message is transmitted via the set of dedicated RACH resources or via the periodic set of common RACH resources.

16. The apparatus of claim 1, wherein the one or more processors are configured to:
receive a beam correspondence message that indicates a correspondence between an uplink reception beam and an uplink transmit beam.

17. The apparatus of claim 1, wherein the set of dedicated RACH resources comprise time resources, frequency resources, preamble sequence resources, or a combination thereof.

18. The apparatus of claim 17, wherein the set of dedicated RACH resources fail to support a contention based random access procedure.

19. The apparatus of claim 1, wherein the one or more processors are configured to:
receive a control message indicating a power ramping procedure, wherein the power ramping procedure is based at least in part on whether a correspondence exists between a transmit beam at the UE and a reception beam at the network entity, and wherein the power ramping procedure is further based at least in part on whether a signal comprising the RACH preamble message is transmitted via the set of dedicated RACH resources or via the periodic set of common RACH resources,
wherein transmitting the first plurality of signals and transmitting at least the second signal are in accordance with the power ramping procedure.

20. An apparatus for wireless communication at a network entity, comprising:
one or more processors;
memory coupled with the one or more processors; and
instructions stored in the memory, the one or more processors configured to:
transmit signaling that indicates a configuration for a repeated transmission of a random access channel (RACH) preamble message for a user equipment (UE) before an expiration of a RACH reponse window during a single RACH transmission occasion, wherein the configuration supports multiple transmissions of the RACH preamble message via a set of dedicated RACH resources comprising a first plurality of symbols, each symbol of the first plurality of symbols associated with a corresponding reception beam of the network entity, the signaling further indicating a threshold quantity of RACH preamble messages for transmission via the set of dedicated RACH resources;

receive, before the expiration of the RACH response window, the RACH preamble message via the set of dedicated RACH resources, a periodic set of common RACH resources, or both using a first uplink transmit beam associated with a first transmission of the RACH preamble message via the set of dedicated RACH resources or a second uplink transmit beam associated with a second transmission of the RACH preamble message via the periodic set of common RACH resources based at least in part on the configuration for the UE, wherein the second uplink transmit beam is different from the first uplink transmit beam, and wherein the periodic set of common RACH resources comprises a second plurality of symbols, each symbol of the second plurality of symbols associated with a second corresponding reception beam of the network entity; and transmit a RACH response to the RACH preamble message before the expiration of the RACH response window.

21. The apparatus of claim 20, wherein, to transmit the signaling that indicates the configuration, the one or more processors are configured to:

transmit a configuration message indicating whether to transmit single or multiple transmissions of the RACH preamble message via the periodic set of common RACH resources common to a plurality of UEs for RACH transmission before the expiration of the RACH response window, and wherein the configuration supports either the single or multiple transmissions of the RACH preamble message via the periodic set of common RACH resources.

22. The apparatus of claim 21, wherein, to receive the RACH preamble message, the one or more processors are configured to:

receive the RACH preamble message via the periodic set of common RACH resources once via the second uplink transmit beam before the expiration of the RACH response window based at least in part on the configuration message.

23. The apparatus of claim 20, wherein, to receive the RACH preamble message, the one or more processors are configured to:

receive the RACH preamble message via the set of dedicated RACH resources a first time via the first uplink transmit beam; and receive the RACH preamble message via the set of dedicated RACH resources a second time via a third uplink transmit beam before the expiration of the RACH response window.

24. A method for wireless communication at a user equipment (UE), comprising:

receiving, from a network entity, signaling that indicates a configuration for a repeated transmission of a random access channel (RACH) preamble message before an expiration of a RACH response window during a single RACH transmission occasion, wherein the configuration supports multiple transmissions of the RACH preamble message via a set of dedicated RACH resources comprising a first plurality of symbols, each symbol of the first plurality of symbols associated with a corresponding reception beam of the network entity, the signaling further indicating a threshold quantity of RACH preamble messages for transmission via the set of dedicated RACH resources;

selecting a set of resources from the set of dedicated RACH resources for transmitting the RACH preamble message based at least in part on the configuration for the UE;

transmitting, in accordance with the threshold quantity of RACH preamble messages for transmission via the set of dedicated RACH resources, a first plurality of signals comprising the RACH preamble message via the selected set of resources using a first plurality of uplink transmit beams before the expiration of the RACH response window;

transmitting at least a second signal comprising the RACH preamble message via at least one resource of a periodic set of common RACH resources using at least one uplink transmit beam before the expiration of the RACH response window, wherein the periodic set of common RACH resources comprises a second plurality of symbols, each symbol of the second plurality of symbols associated with a second corresponding reception beam of the network entity; and receiving a RACH response to the RACH preamble message before the expiration of the RACH response window.

25. The method of claim 24, wherein the configuration supports either single or multiple transmissions of the RACH preamble message via the periodic set of common RACH resources common to a plurality of UEs for RACH transmission, wherein the periodic set of common RACH resources comprise time resources, frequency resources, preamble sequence resources, or a combination thereof associated with a contention based random access procedure for the plurality of UEs.

26. A method for wireless communication at a network entity, comprising:

transmitting signaling that indicates a configuration for a repeated transmission of a random access channel (RACH) preamble message for a user equipment (UE) before an expiration of a RACH response window during a single RACH transmission occasion, wherein the configuration supports multiple transmissions of the RACH preamble message via a set of dedicated RACH resources comprising a first plurality of symbols, each symbol of the first plurality of symbols associated with a corresponding reception beam of the network entity, the signaling further indicating a threshold quantity of RACH preamble messages for transmission via the set of dedicated RACH resources;

receiving, before the expiration of the RACH response window, the RACH preamble message via the set of dedicated RACH resources, a periodic set of common RACH resources, or both using a first uplink transmit beam associated with a first transmission of the RACH preamble message via the set of dedicated RACH resources or a second uplink transmit beam associated with a second transmission of the RACH preamble message via the periodic set of common RACH resources, based at least in part of the configuration for the UE, wherein the second uplink transmit beam is different from the first uplink transmit beam, and wherein the periodic set of common RACH resources comprises a second plurality of symbols, each symbol of the second plurality of symbols associated with a second corresponding reception beam of the network entity; and transmitting a RACH response to the RACH preamble message before the expiration of the RACH response window.

* * * * *